United States Patent [19]

Kohyama et al.

[11] Patent Number: 5,262,228
[45] Date of Patent: Nov. 16, 1993

[54] ETHYLENE/PENTENE-1 COPOLYMER COMPOSITIONS AND THEIR USE

[75] Inventors: Masaki Kohyama; Masaya Yamada, both of Ichihara, Japan

[73] Assignee: Mitsui Petrochemical Industries, Ltd., Tokyo, Japan

[21] Appl. No.: 714,234

[22] Filed: Jun. 12, 1991

[30] Foreign Application Priority Data

Jun. 12, 1990 [JP] Japan .................. 2-153558
Aug. 24, 1990 [JP] Japan .................. 2-223087
Sep. 10, 1990 [JP] Japan .................. 2-239616

[51] Int. Cl.⁵ .......... C08J 5/18; C08L 23/20; C08L 23/04; C08L 23/16
[52] U.S. Cl. .................. 428/220; 525/240; 525/237; 525/232; 525/98; 525/99
[58] Field of Search .......... 525/240; 428/220

[56] References Cited

U.S. PATENT DOCUMENTS

| | | | |
|---|---|---|---|
| 4,303,710 | 12/1981 | Bullard et al. | 525/240 |
| 4,426,498 | 1/1984 | Inoue et al. | 525/240 |
| 4,587,303 | 5/1986 | Turtle | 525/240 |
| 4,793,956 | 12/1988 | Nogiwa et al. | 525/240 |
| 4,801,652 | 1/1989 | Mizutani et al. | 525/240 |
| 4,824,912 | 4/1989 | Su | 525/240 |

FOREIGN PATENT DOCUMENTS

| | | |
|---|---|---|
| 0100689 | 2/1984 | European Pat. Off. |
| 0260038 | 3/1988 | European Pat. Off. |
| 53-125452 | 11/1978 | Japan |
| 1-163235 | 6/1989 | Japan |
| 2097324 | 11/1982 | United Kingdom |

*Primary Examiner*—Carman J. Seccuro, Jr.
*Attorney, Agent, or Firm*—Sherman and Shalloway

[57] ABSTRACT

The ethylene/pentene-1 copolymer composition of the present invention comprises an ethylene/pentene-1 copolymer satisfying specific requests, and a high-pressure polyethylene, polyethylene having a density of greater than 0.935 or low crystalline α-olefin random copolymer. This composition is excellent in transparency, moldability, heat sealing property at low temperature and tear property, and are particularly useful for packaging film material.

9 Claims, 2 Drawing Sheets

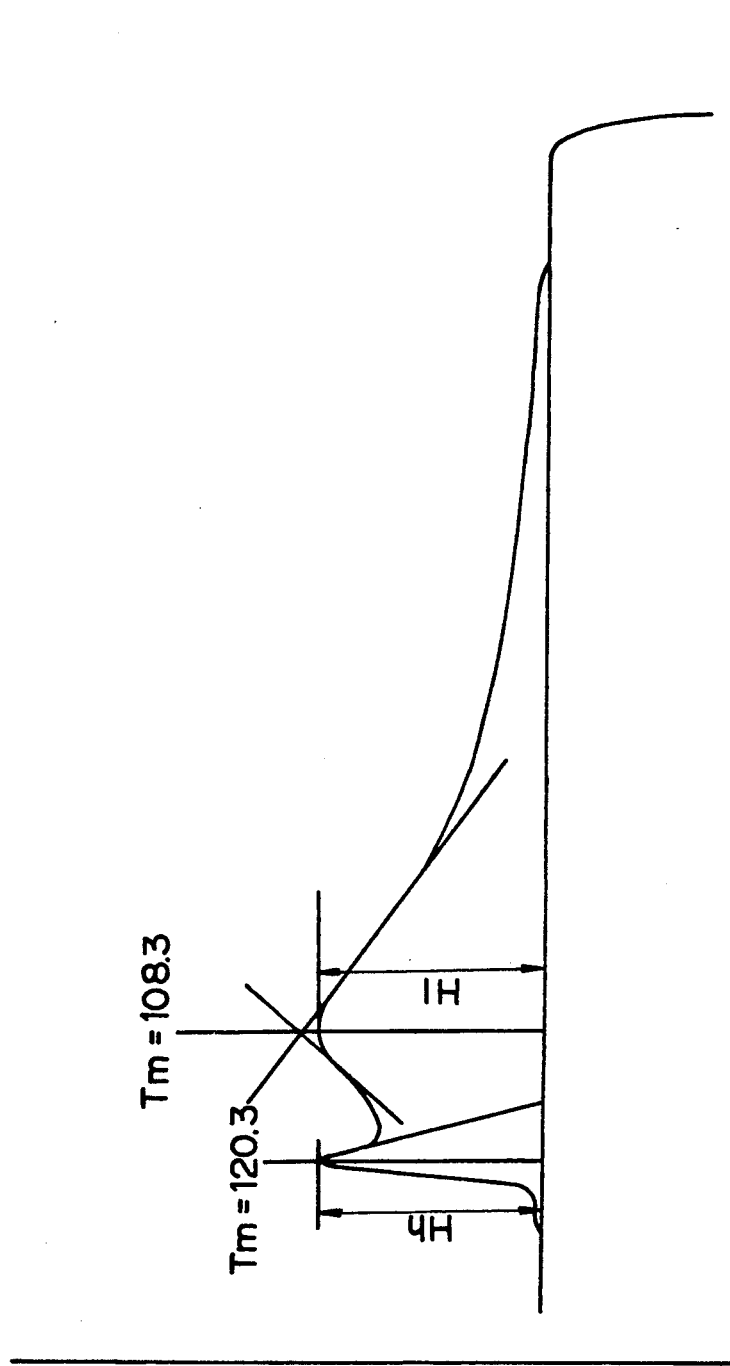

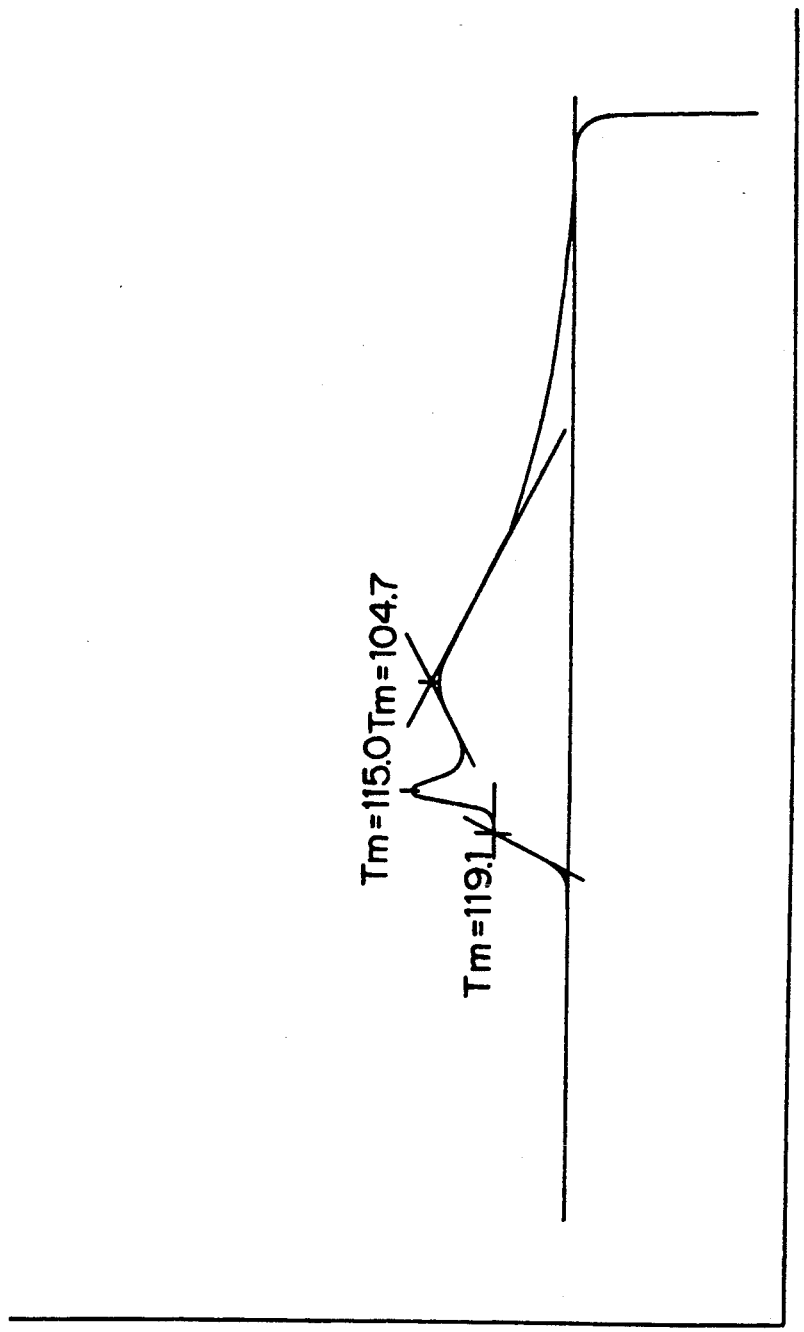

ETHYLENE/PENTENE-1 COPOLYMER COMPOSITIONS AND THEIR USE

FIELD OF THE INVENTION

This invention relates to compositions containing an ethylene/pentene-1 copolymer, and a polyethylene or an α-olefin copolymer, and their use. The films prepared from the compositions according to the present invention have an excellent balance between impact resistance and tear properties, and are particularly useful for packaging films.

BACKGROUND OF THE INVENTION

Polyethylene prepared by the high-pressure process is known as one of polyolefin resins having relatively high transparency, and has been widely used for application in film or hollow container. Speaking about the use of polyethylene in film, however, the high-pressure polyethylene, when molded into film by the air-cooled inflation process often used in common film formation, it becomes difficult to give the product having sufficient transparency, impact resistance and tear resistance. In light of the above-mentioned properties of high-pressure polyethylene, there has been proposed a process for the preparation of improved polyethylene copolymers free from such disadvantages by copolymerization of ethylene and other polymerizable monomers, for example, vinyl acetate This process, however, undesirably brings about such problems that the film resulting from the ethylene copolymer prepared thereby decreases in mechanical strength and rigidity, or said film is liable to undergo blocking, thereby throwing hinderances in the way of the molding operation.

By the way, a copolymer of ethylene and α-olefin of at least 3 carbon atoms prepared by using a Ziegler catalyst is known as a resin excellent in mechanical strength and having a density nearly equal to that of the high pressure-polyethylene. Generally, ethylene/α-olefin copolymers prepared by using a vanadium based catalyst as the Ziegler catalyst are low in melting point, hence heat resistance and mechanical strength comes into question.

An ethylene/α-olefin copolymer prepared by using a mixture of a titanium based catalyst with an organoaluminum compound catalyst component as the Ziegler catalyst, on the other hand, is high in melting point and excellent in heat resistance in comparison with the above-mentioned ethylene/α-olefin copolymer prepared by using the vanadium based catalyst. However, when this ethylene/α-olefin copolymer prepared by using the above-mentioned mixture as the Ziegler catalyst contains, propylene of 3 carbon atoms or butene-1 of 4 carbon atoms as the α-olefin, the mechanical strength of said copolymer comes into question. On that account, the α-olefin used in this ethylene/α-olefin copolymer is selected from among α-olefin having at least 6 carbon atoms in order to obtain sufficient mechanical strength of the resulting copolymer. A film obtained from a copolymer of ethylene and α-olefin having at least 6 carbon atoms is excellent in impact strength, however, has such problems that because of its tear strength highter than that required, the film does not tear easily and becomes poor in tear properties.

The present inventors have already found that a resin having both excellent impact strength and appropriate tear strength, i.e. excellent tear properties, may be obtained by copolymerizing ethylene and pentene-1 of 5 carbon atoms using a titanium solid catalyst component and an organoaluminum compound catalyst component.

It has been ascertained later on, however, that the resin thus obtained is inferior in melt tension and flow characteristics to the high-pressure low density polyethylene, and depending on the catalyst system used therefor, it becomes difficult to obtain a copolymer having good transparency. In the course of forming a film from a resin, when the resin is poor in flow characteristics and melt tension (hereinafter these properties are sometimes called "moldability" by combining them together) even when its original properties are excellent, the resulting film becomes poor in bubbling stability and the surface of the film is liable to wrinkle, and further it is difficult to thin the film. Similarly, in molding a hollow container, it is difficult to aim at speeding up of the molding operation. In either case, the use of a resin poor in moldability is not desirable. For improving flow characteristics of a resin, usually a melt index of the resin is increased, that is, a molecular weight of the resin is decreased. In this case, however, the resin thus treated becomes poor in melt tension and also decreases in impact strength, though the flow characteristics of the resin are improved.

In order to solve the above-mentioned problems, it is also not impossible to try to improve the polymer in flow characteristics by widering a molecular weight distribution and/or a composition distribution of said polymer. The resin thus treated, however, deteniorates in transparency as well as in impact resistance and becomes also sticky, though it certainly improves in flow characteristics. The resin thus obtained is also found to be poor in melt tension.

Moreover, as the result of investigating the characteristics of the ethylene/pentene-1 copolymer conducted by the present inventors, it has been found that there is still a room for improving blocking resistance and heat sealing properties at low temperature among the chracteristics of the copolymer.

OBJECT OF THE INVENTION

An object of the present invention is to provide ethylene/pentene-1 copolymer compositions having physical properties appropriate for materials for packaging films.

Another object of the present invention is to provide films composed of an ethylene/pentene-1 copolymer composition as described above.

SUMMARY OF THE INVENTION

The first ethylene/pentene-1 copolymer composition of the present invention is characterized by containing (A) an ethylene/pentene-1 copolymer obtained by copolymerization of ethylene and pentene-1, said ethylene/pentene-1 copolymer satisfying the following requisites (a) to (d):

(a) A melt flow rate of the copolymer as measured according to ASTM D 1238E is 0.01–100 g/10 min, (b) a density of the copolymer as measured according to ASTM D 1505 is 0.87–0.96 g/cm$^3$.

(c) the copolymer contains 1–25% by weight of a structural unit derived from pentene-1, and (d) in a film of 40 μm in thickness obtained by cast film extrusion of the copolymer, a ratio (RS) of impact strength of the film to tear strength of the film in the take-off direction of the film satisfies the following formula:

$$RS \geq -20\log MFR - 1000d + 968$$

wherein MFR represents a melt flow rate of said polymer, and d represents a density of said copolymer, and (B) a high-pressure polyethylene in the ratio (A:B) of 99:1 to 60:40 by weight.

A second ethylene/pentene-1 copolymer composition according to the present invention comprises (A) the ethylene/pentene-1 copolymer described above, and (C) a polyethylene having a density of greater than 0.935 in the ratio (A:C) of 99:1 to 60:40 by weight.

A third ethylene/pentene-1 copolymer composition according to the present invention comprises (A) the ethylene/pentene-1 copolymer described above, and (D) a low crystalline or amorphous α-olefin random copolymer other than ethylene/pentene-1 copolymer, prepared by copolymerizing at least two kinds of α-olefins in the ratio (A:D) of 99:1 to 60:40.

Furthermore, the films of the invention are formed from the first, second or third ethylene/pentene-1 copolymer composition as described above.

BRIEF DESCRIPTION OF THE DRAWINGS

FIG. 1 is a DSC melt-peak pattern obtained by measuring under usual measuring conditions "an ultra-slowly cooled sample" of the ethylene/pentene-1 copolymer used in the present invention.

FIG. 2 is a DSC melt-peak pattern obtained by measuring under usual measuring conditions a usual-slowly cooled sample of the ethylene/pentene-1 copolymer used in the present invention.

DETAILED DESCRIPTION OF THE INVENTION

The ethylene/pentene-1 copolymer compositions of the present invention are illustrated below in detail.

ETHYLENE/PENTENE-1 COPOLYMER (A)

The ethylene/pentene-1 copolymers (A) used in the invention are illustrated below in detail.

The ethylene/pentene-1 copolymers used in the invention are random copolymers obtained by copolymerization of ethylene and pentene-1. Such ethylene/pentene-1 copolymers as used in the invention may be prepared by various processes. As concrete examples of the ethylene/pentene-1 copolymers that can be used in the invention, there may be mentioned those obtained by three processes embodied according to the invention. The ethylene/pentene-1 copolymers obtained by the above-mentioned three embodiments are called, for convenience, the ethylene/pentene-1 copolymers [I], [II] and [III], respectively. In the present invention, however, there may be used not only the above-mentioned copolymers [I], [II] and [III] but also mixtures thereof or ethylene/pentene-1 copolymers obtained by processes other than the above-mentioned three processes.

In the ethylene/pentene-1 copolymers [I], [II] and [III], small amounts of other α-olefins or polyenes in addition to ethylene and pentene-1 may be copolymerized. Examples of other α-olefins mentioned above include, for example, propylene, 2-methylpropylene, 1-butene, 1-hexene, 4-methyl-1-pentene, 3-methyl-1-pentene, 1-octene, nonene-1, decene-1, undecene-1 and dodecene-1. Examples of the above-mentioned polyenes include butadiene, isoprene, 1,4-hexadiene, dicyclopentadiene and 5-ethylidene-2-norbornene.

The ethylene/pentene-1 copolymers [I] are illustrated below with respect to their physical properties, followed by illustration of the process for the preparation thereof.

The ethylene/pentene-1 copolymers [I] used in the invention have a melt flow rate (MFR) of 0.01 to 100 g/10 min, preferably 0.05 to 50 g/10 min as measured according to ASTM D 1238E. When this MFR of the copolymer is less than 0.01 g/10 min, said coplymer deteriorates in moldability and the molded product such as a film obtained therefrom tends to decrease in transparency, while when MFR of the copolymer exceeds 100 g/10 min, said copolymer tends to decrease in mechanical strength.

The ethylene/pentene-1 copolymers [I] used in the invention have a density of 0.87 to 0.96 g/cm$^3$, preferably 0.88 to 0.94 g/cm$^3$ as measured according to ASTM D 1505.

In the ethylene/pentene-1 copolymers [I] used in the invention, there are present the structural unit derived from pentene-1 in an amount of 1 to 25% by weight, preferably 4 to 23% by weight and especially 6 to 20% by weight, and the structural unit derived from ethylene in an amount of 75 to 99% by weight, preferably 77 to 96% by weight and especially 80 to 94% by weight.

The ethylene/pentene-1 copolymers [I] may contain, as mentioned above, a struactual unit derived from α-oelfins other than ethylene and pentene-1 in an amount of not more than 10% by weight, preferably not more than 5% by weight and especially not more than 3% by weight.

The ratio (RS) of the impact strength of a film of 40 μm in thickness to tear strength therefor in the take-off direction is represented by the following formula [1], said film being obtained by cast film extrusion of the ethylene/pentene-1 copolymer [1] having the above-mentioned properties.

$$RS \geq -20\log MFR - 1000d + 968 \qquad [1]$$

wherein MFR is the melt flow rate of the copolymer and d is a density of the copolymer, preferably $$RS \geq -20\log MFR - 1000d + 973 \qquad [1']$$

and especially $$RS \geq -20\log MFR - 1000d + 975 \qquad [1''].$$

When the ratio (RS) of the impact strength to the tear strength in the above-mentioned film is less than (20log MFR−1000d+968), the film tends to be poor in tear properties, though it has a high impact strength, or the film tends to be poor in impact strength, though it has good tear properties. The film of 40 μm in thickness used for the determination of the RS value is a film prepared from the ethylene/pentene-1 copolymer [I]under the following conditions.

That is, the film was formed by means of a T-die film forming machine equipped with a 65 mmφ extruder using a resin temperature at die of 220° to 240° C., a chill roll temperature of 30° to 40° C., a film forming rate of 20 to 40 m/min, and a draft ratio (film thickness/lip opening (mm)) of 0.05 to 0.07.

The cast film of 40 μm in thickness obtained by processing the ethylene/pentene-1 copolymer [I] having the above-mentioned properties in the manner mentioned above has an impact strength of usually more than 1000 kg·cm/cm, preferably more than 1200 kg·cm/cm.

It is preferable that the tear strength ($T_{MD}$) of the said film in the take-off direction and a melt flow rate (MFR) of the ethylene/pentene-1 copolymer fulfills the relationship therebetween represented by the following formula [2].

$$\log T_{MD} \leq -0.37 \log MFR - 5.1d + 6.72 \quad [2]$$

wherein d represents a density of the copolymer, preferably $$\log T_{MD} \leq -0.37 \log MFR - 5.1d + 6.65 \quad [2']$$

and especially $$\log T_{MD} \leq -0.37 \log MFR - 5.1d + 6.59 \quad [2''].$$

Films excellent in impact strength as well as in tear properties can be obtained from the ethylene/pentene-1 copolymers which fulfill the relationship represented by the above-mentioned formula [2] between the tear strength ($T_{MD}$) of the film and MFR.

Pressed sheets of 2 mm in thickness obtained by molding the above-mentioned ethylene/pentene-1 copolymers according to ASTM D 1928 have stress cracking resistance (SC resistance (ESCR) measured according to ASTM D 1692, antalocks 10%, 50° C.) of at least 10 hr and satisfy the relationship represented by the following formula [3-a].

$$ESCR \geq 0.7 \times 10^4 (\log 80 - \log MFR)^3 (0.952 - d) \quad [3\text{-a}]$$

wherein $2.0 \leq MFR \leq 50$, and d is a density of the copolymer, preferably $$ESCR \geq 0.9 \times 10^4 (\log 80 - \log MFR)^3 (0.952 - d) \quad [3'\text{-a}]$$

and especially $$ESCR \geq 1.1 \times 10^4 (\log 80 - \log MFR)^3 (0.952 - d) \quad [3''\text{-a}].$$

Further, pressed sheets of 2 mm in thickness obtained by molding the ethylene/pentene-1 copolymers [I] according to ASTM D 1928 have stress cracking resistance (SC resistance (ESCR) measured according to ASTM D 1692, antalocks 10%, 50° C.) of at least 20 hr and satisfy the relationship represented by the following formula [3-b].

$$ESCR \geq 1.4 \times 10^4 (\log 40 - \log MFR)^2 (0.952 - d) \quad [3\text{-b}]$$

wherein $1.0 \leq MFR \leq 20$, and d represents a density of the copolymer, preferably $$ESCR \geq 1.7 \times 10^4 (\log 40 - \log MFR)^2 (0.952 - d) \quad [3'\text{-b}]$$

and especially $$ESCR \geq 2.0 \times 10^4 (\log 40 - \log MFR)^2 (0.952 - d) \quad [3''\text{-b}].$$

Furthermore, pressed sheets of 2 mm in thickness obtained by molding the ethylene/pentene-1 copolymers [I] according to ASTM D 1928 have stress cracking resistance (SC resistance (ESCR) measured according to ASTM D 1692, antalocks 10%, 60° C.) of at least 50 hr and satisfy the relationship represented by the following formula [3-c].

$$ESCR \geq 0.50 \times 10^4 (\log 100 - \log MFR) (0.952 - d) \quad [3\text{-c}]$$

wherein $0.1 \leq MFR \leq 5$, and d represents a density of the copolymer, preferably $$ESCR \geq 0.65 \times 10^4 (\log 100 - \log MFR) (0.952 - d) \quad [3'\text{-c}]$$

and especially $$ESCR \geq 0.80 \times 10^4 (\log 100 - \log MFR) (0.952 - d) \quad [3''\text{-c}].$$

Moreover, it is preferable that the haze (HAZE) of the above-mentioned pressed sheets and the melt flow rate (MFR) of the ethylene/pentene-1 copolymers satisfy the relationship represented by the following formula [4].

$$\log HAZE \leq 15d - 0.45 \log MFR - 12.23 \quad [4]$$

wherein d represents a density of the copolymer, preferably $$\log HAZE \leq 15d - 0.45 \log MFR - 12.26 \quad [4']$$

and especially $$\log HAZE \leq 15d - 0.45 \log MFR - 12.30 \quad [4''].$$

The pressed sheets of 0.1 mm in thickness used for the measurement of the above-mentioned physical properties were prepared from the ethylene/pentene-1 copolymers [I] according to ASTM D 1928.

The measurement of HAZE was conducted according to ASTM D 1003.

The ethylene/pentene-1 copolymers [I], the pressed sheets of which will satisfy the above-mentioned relationship between stress cracking resistance and haze in the manner mentioned above, are capable of giving molded articles which are transparent and which hardly cause environmental stress cracking, that is, the content leakage trouble hardly arises, when said copolymers are molded into articles by injection molding, rotary molding or inflation molding.

The process for the preparation of the ethylene/pentene-1 copolymers [I] having the above-mentioned characteristics is illustrated hereinafter.

The ethylene/pentene-1 copolymers [I] used in the invention may be prepared, for example, by copolymerization of ethylene and pentene-1 in the presence of such olefin polymerization catalysts as mentioned below.

The olefin polymerization catalysts used for the preparation of the ethylene/pentene-1 copolymers [I] used in the invention are, for example those disclosed by the present applicant in Japanese Patent-L-O-P Publn. No. 811/1981. The disclosed olefin polymerization catalysts contain

[A] a solid titanium catalyst component containing magnesium, titanium, halogen and an electron donors its essential ingredients obtained by bringing (i) a liquid magnesium compound having no reducing ability and (ii) a liquid titanium compound into contact; as they are, with each other in the presence of (iii) an electron donor having no active hydrogen, or by bringing said (i) and said (ii) into contact, as they are, with each other, followed by contact with said (iii), and

[B] an organic compound catalyst component of a metal belonging to the Groups I to III of the periodic table.

The magnesium compounds having no reducing ability referred to herein, that is, magnesium compounds having no magnesium-carbon bond or no magnesium hydrogen bond, which are used in the preparation of the solid titanium catalyst component [A] as mentioned above, may be those derived from magnesium compounds having reducing ability. Such magnesium compounds having no reducing ability as mentioned above include halogenated magnesium such as magnesium chloride, magnesium bromide, magnesium iodide or magnesium fluoride;

alkoxymagnesium halide such as methoxy magnesium chloride, ethoxymagnesium chloride, isopropoxy magnesium chloride, butoxy magnesium chloride or octoxy magnesium chloride;

aryloxy magnesium halide such as phenoxy magnesium chloride or methylphenoxy magnesium chloride;

alkoxy magnesium such as ethoxy magnesium, isopropoxy magnesium, butoxy magnesium, n-octoxy magnesium or 2-ethylhexoxy magnesium;

aryloxy magnesium such as phenoxy magnesium or dimethylphenoxy magnesium; and magnesium carboxylate such as magnesium laurate or magnesium stearate.

The magnesium compounds having no reducing ability exemplified above may those derived from magnesium compounds having reducing ability or those derived at the time of preparation of catalyst component. The magnesium compounds having no reducing ability may be derived from the magnesium compounds having reducing ability, for example, by bringing said magnesium compounds having reducing ability into contact with polysiloxane compounds, halogen containing silane compounds, halogen containing aluminum compounds or compounds such as esters, alcohols, etc.

The magnesium compounds having reducing ability as referred to herein may include, for example, those having a megnesium-carbon bond or magnesium-hydrogen bond. Concrete examples of such magnesium compounds as having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmegnesium chloride, amylmagnesium chloride, butyl ethoxy magnesium, ethyl butyl magnesium, octyl butyl magnesium, butylmagnesium halide, etc.

Besides the above-exemplified magnesium compounds having reducing ability or having no reducing ability, the magnesium compounds used in the present invention may also be complex or composite compounds of the above-exemplified magnesium compounds with other metals, or mixtures thereof. Further, the magnesium compounds used herein may also be mixtures of two or more of these compounds as mentioned above.

Of these magnesium compounds exemplified above, preferred are those having no reducing ability, particularly halogen containing magnesium compounds. Of the halogen containing magnesium compounds, preferred are magnesium chloride, alkoxy magnesium chloride and aryloxy magnesium chloride.

The liquid magnesium compound (i) use in the preparation of the solid titanium catalyst component [A] is suitably a solution of the magnesium compound having no reducing ability in a hydrocarbon solvent, electron donor or a mixture thereof in which said magnesium compound is soluble. The hydrocarbon solvent used for preparing the liquid magnesium compound mentioned above includes aliphatic hydrocarbons such as pentane, hexane, heptane, octane, decane, dodecane, tetradecane, kerosine, etc.;

alicyclic hydrocarbons such as cyclopentane, methylcylopentane, cyclohexane, cyclooctane, cyclohexene, etc.;

aromatic hydrocarbons such as benzene, toluene, xylene, ethylbenzene, cumene, cymene, etc.; and halogenated hydrocarbons such as dichloroethane, dichloropropane, trichloroethylene, carbon tetrachloride, dichlorobenzene, etc.

The solution of the magnesium compound in the hydrocarbon solvent as mentioned above may be obatined by various methods, though they vary according to the kind of the magnesium compound and of the solvent used, for example, a method in which the magnesium compound is mixed simply with the solvent, a method in which a mixture of the magnesium compound and the solvent is heated, and a method in which the magnesium compound is added to an electron donor in which said magnesium compound is soluble, for example, alcohol, aldehyde, amine or carboxylic acid, any mixture thereof, or said mixture with other electron donor, followed by heating if necessary. For example, when a halogen containing magnesium compound is dissolved in a hydrocarbon solvent, alcohol is used in an amount of more than 1 mole, preferably from about 1 to about 20 moles and especially form about 5 to about 12 moles per mole of the halogen containing magnesium compound used, though the amount of alcohol used varies according to the kind and amount of the hydrocarbon solvent used and to the kind of the magnesium compound used. When aliphatic hydrocarbons and/or alicyclic hydrocarbons are used as the hydrocarbon solvents, alcohol is used in the proportion as defined above. In that case, it is particularly preferable to use alcohol of 6 or more carbon atoms in an amount of more than about 1 mole, preferably more than about 1.5 moles per mole of the halogen containing magnesium compound used, because the halogen containing magnesium compound can be solubilized by the use of a relatively small amount of the alcohol, and the resulting catalyst component is found to be high in catalytic activity. In that case, when alcohol of not more than 5 carbon atoms is used alone, it is necessary to use more than about 15 moles of the alcohol per mole of the halogen containing magnesium compound used, and the catalytic activity of the resulting catalyst component is inferior to that attained in the system mentioned above. On the one hand, when aromatic hydrocarbons are used as the hydrocarbon solvents, it is possible to solubilize the halogen containing magnesium compound by the use of alcohol in the amount as defined above, irrespective of the kind of alcohol used.

Contact between the halogen containing magnesium compound and alcohol is preferably effected in the hydrocarbon solvent at a temperature of usually above room temperature and, according to the kind of the hydrocarbon solvent used, at a temperature of higher than about 65° C., preferably about 80° to about 300° C. and especially about 100° to about 200° C. for a period of from 15 minutes to 5 hours, preferably from 30 minutes to 2 hours. Preferred alcohols having not less than 6 carbon atoms include, for example, aliphatic alcohols such as 2-methylpentanol, 2-ehylbutanol, n-heptanol, n-octanol, 2-ethyhexanol, decanol, dodecanol, tetradecyl alocohol, undecenol, oleyl alcohol and stearyl alcohol;

aromatic alcohols such as benyl alcohol, methylbenzyl alcohol, isopropylbenzyl alcohol, α-methylbenzyl alcohol and α,α-dimethylbenzyl alcohol;

and aliphatic alcohols containing alkoxy group such as n-butyl cellosolve or 1-butoxy-2-propanpl.

Examples of other alcohols include those having not more than 5 carbon atoms such as methanol, ethanol, propanol, butanol, ethylene glycol and methylcarbitol.

When carboxylic acid is used, preferred are organic carboxylic acid having not less than 7 carbon atoms, for example, capric acid, 2-ethylhexanonic acid, undecylenic acid, nonylic acid and octanic acid.

When aldehyde is used, preferred are those having not less than 7 carbon atoms, for example, capric aldehyde, 2-ethylhexyl aldehyde and undecylic aldehyde.

When amine is used, preferred are those having not less than 6 carbon atoms, for example, heptylamine, octylamine, nonylamine, decylamine, laurylamine, undecylamine and 2-ethylhexylamine. When the carboxylic acids, aldehydes or amines exemplified above are used, a preferred amount thereof and a preferred temperature used therefor are practically the same as those employed in the case of the alcohols.

Examples of other electron donors which can be used in combination with the above-mentioned magnesium compound-solubilizing donors are organic acid esters, organic acid halides, organic acid anhydrides, ethers, ketones, tertiary amines, phosphorous acid esters, phosphoric acid esters, phosphoric acid amides, carboxylic acid amides, nitriles, etc. Concrete examples of these electron donors are those similar to the electron donors (iii) having no active hydrogen as will be mentioned later.

The above-mentioned solution of the magnesium compound in hydrocarbon con also be formed by dissolving in the hydrocarbon other magnesium compound or magnesium metal convertible into the above-mentioned magnesium compound while converting said other magnesium compound or metal into the above-mentioned magnesium compound. For example, the solution of a halogen containing magnesium compound having no reducing ability in hydrocarbon can be formed by dissolving or suspending a magnesium compound having such a group as alkyl, alkoxy, aryloxy, acyl, amino or hydroxy, magnesium oxide or magnesium metal in a hydrocarbon solvent having dissolved therein the above-mentioned alcohol, amine, aldehyde or carboxylic acid while halogenating said magnesium compound, magnesium oxide or magnesium metal with a halogenation agent such as hydrogen halide, silicone halide or halogen. Furthermore, a magnesium compound having no reducing ability can be solubilized in a hydrocarbon solvent by treatment with a compound capable of extinction of reducing ability, such as alcohol, ketone, ester, ether, acid halide, silanol or siloxane, of Grinard reagent, dialkylmagnesium, magnesium hydride or a complex compound thereof with other organometallic compound, for example, such magnesium compound having reducing ability as represented by the formula:

$$M_a Mg_b R^1_p R^2_q X_r Y_s$$

wherein M represents aluminum, zinc, boron or beryllium atom, $R^1$ and $R^2$ each represent hydrocarbon radical, X and Y each represent the group $OR^3$, $OSiR^4R^5R^6$, $NR^7R^8$ or $SR^9$ in which $R^3$, $R^4$, $R^5$, $R^6$, $R^7$ and $R^8$ each represent hydrogen or hydrocarbon radical and $R^9$ represents hydrocarbon radical, a, b>0, p, q, r, s≧0, b/a≧0.5, and when the number of valences of M is taken as m, the equation p+q+r+s=ma+2b is satisfied and the relation 0≦(r+s)/(a+b)<1.0 is established.

In preparing the aforementioned catalyst, it is essential to use the magnesium compound having no reducing ability, but this does not mean that a combination use of the magnesium compound having reducing ability should totally be excluded in that case. In many cases, however, the combination use of the magnesium compound having reducing ability in large amounts is found to be unfavorable.

It is also possible to use a solution of electron donors as a solvent for the magnesium compound. Preferred examples of such electron donors as used for this purpose are alcohol, amine, aldehyde and carboxylic acids as exemplified previously, and alcohol is preferred in particular. Examples of other electron donors are phenol, ketone, ester, ether, amide, acid anhydride, acid halide, nitrile, isocyanate, etc. The magnesium compound may be dissolved in such an electron donor solution as mentioned above under the conditions corresponding generally to those employed in the case of dissolving the magnesium compound in the hydrocarbon solvent using the electron donor as mentioned previously. Generally, however, in this case the system must be maintained at high temperatures and, therefore, from the viewpoint of preparing catalysts, the use of the solution of the magnesium compound in hydrocarbon is better than that of the solution of the magnesium compound in electron donor to obtain the catalysts of high performance with case.

The titanium compound (ii) used in the preparation of the solid titanium catalyst component [A] includes, for example, tetravalent titanium compounds represented by the formula $Ti(OR)_g X_{4-g}$ (wherein R is a hydrocarbon radical, X is halogen, and 0≦g≦4). More particularly, these titanium compounds include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-i-so-C_4H_9)Br_3$; dialkoxydihalides such as $Ti(OCH_3)_2Cl_2$, $Ti(OCH_2H_5)_2Cl$, $Ti(O-n-C_4H_9)_2Cl$ and $Ti(OC_2H_5)_2Br_2$; trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitanium such as $Ti(OCH_3)_4$, $Ti(OC_2H_5)_4$, $Ti(O\ n-C_4H_9)_4$, $Ti(O-i-so-C_4H_9)_4$ and $Ti(O-2-ethylhexyl)_4$.

Of these titanium compounds exemplified above, preferred are halogen containing titanium compounds, in particular, titanium tetrahalides and especially titanium tetrachloride. These titanium compounds may be used either singly or in admixture of two or more, and also they may be diluted, before use, with hydrocarbon compounds or halogenated hydrocarbon compounds.

The electron donor (iii) having no active hydrogen used in the preparation of the solid titanium catalyst component [A] includes organic acid esters, organic acid halides, organic acid anhydrides, ethers, ketones, tertiary amines, phosphorous acid esters, phosphoric acid esters, phosphoric acid amides, carboxylic acid amides, nitriles, etc. Concrete examples of such electron donors as mentioned above include:

ketones of 3–15 carbon atoms such as acetone, methyl ethyl ketone, methyl isobutyl ketone, acetophenone, benzophenone and benzoquinone;

aldehydes of 2–15 carbon atoms such as acetaldehyde, propionaldehyde, octylaldehyde, benzaldehyde, toluylaldehyde and naphthoaldehyde;

organic acid esters of 2–30 carbon atoms such as methy formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl dicyclohexenedicarboxylate, diethyl nadate, diisopropyl tetrahydrophthalate, di-n-butyl phthalate, di-2-ethylhexyl phthalate, $\gamma$-butyrolactone, $\delta$-valerolactone, coumarin phthalide and ethylene carbonate;

acid halides of 2–15 carbon atoms such as acetyl chloride, benzoyl chloride, toluylic acid chloride and anisic acid chloride;

ethers and diethers each having 2–20 carbon atoms such as methyl ether, ethyl ether, isopropyl ether, butyl ether, amyl ether, tetrahydrofuran, anisole and diphenyl ether epoxy-p-methane, acid amides such as acetamide, benzamide and totuylic acid amide;

amines such as methylamine, ethylamine, diethylamine, tributylamine, piperidine, tribenzylamine, aniline, pyridine, picoline and tetramethylenediamine; and nitriles such as acetonitrile, benzonitrile and tolunitrile. These electron donors as exemplified above may be used either singly or in combination of two or more. Of these electron donors, preferred are organic acid esters particularly aromatic carboxylic acid esters. It is not always necessary to use these electron donors as starting substances, and they can also be formed in the course of a process for the preparation of the solid titanium catalyst component [A]. These electron donors may also be used in the form of addition compound or complex compound with other compounds.

The solid titanium catalyst component [A] can be obtained (a) by bringing the above-mentioned liquid magnesium compound (i) having no reducing ability into contact with the liquid titanium compound (ii) in the presence of the electron donor (iii) having no active hydrogen.

This solid titanium catalyst component [A] may also be obtained (b) by bringing the above-mentioned (i) into contact with the above-mentioned (ii), followed by contact with the above-mentioned (iii).

In the procedure (a) mentioned above, when an electron donor has been contained in the above-mentioned (i) and/or the above-mentioned (ii), no further addition of the electron donor (iii) is necessary when said (i) and (ii) are brought into contact with each other. However, it is also possible to add in advance the electron donor (iii) in the (i) and/or the (ii), and said (i) and (ii) are brought into contact with each other while further adding the (iii) thereto.

The electron donor (iii) may be contained in the liquid magnesium compound (i) by simply mixing it with the solution of said magnesium compound, or by previously adding said electron donor (iii) in advance to the solvent in which the magnesium compound is dissolved.

For example, a hydrocarbon solution containing an alkylmagnesium compound having reducing ability, the reducing ability of which has been disappeared by the addition of excess electron donor having no active hydrogen or reduced the reducing ability by the addition of a mixture of an electron donor having active hydrogen and an electron donor having no active hydrogen, is solubilized in a hydrocarbon solvent by the procedure as mentioned previously. It is also possible in that case that instead of using the electron donor (iii) itself from the start, a compound capable of converting into the electron donor (iii) is used and allowed to undergo reaction in situ to form said electron donor (iii).

The amount of the electron donor (iii) used is 0.01–10 moles, preferably 0.01–1 mole and especially 0.1–0.5 mole per mole of the magnesium compound used. Even when the electron donor is used in large amounts, the solid catalyst component of high performance is obtained if the amount of the titanium compound used is controlled, but the use of the electron donor (iii) in such proportion as defined above.

The titanium compound in a liquid state (under contact conditions) is a liquid titanium compound in itself or a solution of the titanium compound in hydrocarbon. The electron donor (iii) or a compound capable of converting into the electron donor (iii) in a process of reaction may be contained in this liquid titanium compound. In this case, however, it is preferable to use the titanium compound in large amount so that a free titanium compound which does not form a complex compound with the electron donor (iii) is present in the system. That is, it is desirable to use the titanium compound in an amount, based on 1 mole of the electron donor (iii), in excess of 1 mole, preferably in the proportion of more than 5 moles. The amount of the titanium compound used must be sufficient for forming a solid product thereof on contact without applying a special separation means, and accordingly when the amount of the titanium compound used is small, no precipitation occur by the contact between the two. The amount of the titanium compound to be used, though it varies according to the kind thereof, contact conditions employed or to the amount of the electron donor used, is more than about 1 mole, usually from about 5 to about 200 moles and preferably from about 10 to about 100 moles. The titanium compound is preferably used in an amount, based on 1 mole of the electron donor (iii), of more than about 1 mole, preferably more than about 5 moles.

In preparing the solid titanium catalyst component [A], the liquid magnesium compound (i) having no reducing ability and the liquid titanium compound are brought into contact with each other by any of the aforementioned procedures for mixing the magnesium compound with the liquid titanium compound. In this case, the resulting solid titanium catalyst component sometimes varies in shape or size according to the contact conditions employed. Of the procedures as aforementioned, preferred is a procedure wherein the liquid titanium compound and the liquid magnesium compound are mixed together at such a sufficiently low temperature that a solid product is not formed rapidly by the contact between the two compounds, and the temperature is then elevated so that the solid product is formed gradually. According to this procedure, it is easy to obtain a granular solid catalyst component relatively large in particle diameter or a spherical solid catalyst component. In this procedure, moreover, when an appropriate amount of the electron donor (iii) having no active hydrogen is allowed to present in the system, there is obtained a granular or spherical solid catalyst component further improved in particle size distribution. The polymer obtained by the use of a catalyst containing such solid titanium catalyst component as mentioned above is granular or spherical in shape, large in particle size distribution and bulk density, and favorable in flowability. The term granular used herein is intended to mean the shape of a solid product as if it were formed by agglomeration of fine particles when viewed from an enlarged photograph thereof. According to the process for preparing the solid catalyst component employed, there can be obtained solid catalyst components in the shape of form granules having rugged surface to a true sphere.

The temperature at which the liquid titanium compound and the liquid magnesium compound are brought into contact with each other is, for example, a temperature of from about $-70°$ to about $+200°$ C. In this case, the two liquid compounds to be brought into contact with each other may be different in temperature from each other. Generally, the solid catalyst component having a favorable shape of granule or sphere and having a high performance is obtained in most cases by the aforementioned procedure wherein the liquid titanium compound and the liquid magnesium compound are brought into contact with each other at a relatively low temperature, for example, a temperature of from $-70°$ to $+50°$ C. In this case, the solid product will not be separated by the contact of the two compounds when the contact temperature is low. In such a case, the solid product is allowed to separate by reaction at a temperature elevated to about 50° to about 150° C., or by prolonging the contact time. The solid product thus separated is desirably washed at least one time at a temperature of from about 50° to about 150° C. with a liquid titanium compound, preferably excess titanium tetrachloride. Thereafter, the solid titanium catalyst component thus obtained is usually washed with hydrocarbon and then used in the preparation of the olefin polymerization catalyst of the present invention.

This procedure is an excellent procedure since the solid catalyst component having high performance is obtained by simple operation.

In the aforementioned procedure (b), the solid titanium catalyst component [A] is prepared in the following manner.

A suspension containing a solid product is obtained by bringing the liquid magnesium compound into contact with the liquid titanium compound under the same conditions as employed in the procedure (a) mentioned previously. Generally, the electron donor (iii) is added to the suspension and allowed to react therewith at a temperature, for example, from about 0° to about 150° C. The amount of the electron donor (iii) used in this case is the same as that used in the procedure (a).

Furthermore, the above-mentioned procedure (b) may also be used in combination with the procedure (a). According to this combined procedure, the shape and particle diameter of the resulting solid product can be adjusted to as desired by virtue of the procedure (a), and the micro-adjustment control of the resulting catalyst component can be made. In one embodiment of this combined procedure, the liquid magnesium compound and the liquid titanium compound are brought into contact with each other in the coexistence of the electron donor (iii) to separate the solid product, and the thus separated solid product is further brought into contact with the electron donor (iii).

The solid titanium catalyst component [A] obtained by each procedure as mentioned above is thoroughly washed with and used for the preparation of the olefin polymerization catalyst of the present invention.

The solid titanium catalyst component [A] thus obtained desirably has a magnesium/titanium (atomic ratio) of usually about 2–100, preferably about 4–50 and especially about 5 to about 30, a halogen/titanium (atomic ratio) of usually about 4–100, preferably 5–90 and especially from about 8 to about 50, and an electron donor/titanium (molar ratio) of usually about 0.01–100, preferably from about 0.2 to about 10 and especially about 0.4 to about 6.

As mentioned previously, this solid titanium catalyst component, in most cases, is granular or almost spherical in shape, and has a specific surface area of usually about more than 10 m$^2$/g, preferably 100–1000 m$^2$/g.

The organometallic compound catalyst component [B] is illustrated hereinafter.

Examples of the organoaluminum compound catalyst component [B] of a metal belonging to Group I to III in the periodic table include compounds having at least one Al-carbon bond in the molecular, for example, organoaluminum compounds represented by the following formula (i)

$$R^1{}_m Al(OR^2)_n H_p X_q \qquad (i)$$

wherein $R^1$ and $R^2$ may be the same or different and represent independently a hydrocarbon group having normally 1 to 15 carbon atoms, preferably 1 to 4 carbon atoms; X is halogen; and m, n, p and q are numbers satisfying $0<m\leq 3$, $0\leq n<3$, $0\leq p<3$, $0\leq q<3$ and $m+n+p+q=3$;

complex alkyl compounds of aluminum with Group I metals of the periodic table, represented by the following formula (ii)

$$M^1 AlR^1{}_4 \qquad (ii)$$

wherein $M^1$ is Li, Na or K and $R^1$ is as defined above; and dialkyl compounds of Group II or III metals represented by the following formula $$R^1 R^2 M^2 \qquad (3)$$

wherein $R^1$ and $R^2$ are as defined above, and $M^2$ is Mg, Zn or Cd.

Examples of the organoaluminum compounds having the formula (1) include:

compounds having the general formula of $R^1{}_m Al(OR^2)_{3-m}$ wherein $R^1$ and $R^2$ are as defined above, and m is a number preferably satisfying $1.5\leq m\leq 3$;

compounds having the general formula of $R^1{}_m AlX_{3-m}$ wherein $R^1$ and X are as defined above, and m is a number preferably satisfying $0<m<3$;

compounds having the general formula of $R^1{}_m AlH_{3-m}$ wherein $R^1$ is as defined above, and m is a number preferably satisfying $2\leq m<3$; and compounds having the general formula of $R^1{}_mAl(OR^2)_nX_q$ wherein $R^1$, $R^2$ and X are as defined above, and m, n and q are numbers satisfying $0<m\leq3$, $0\leq n<3$, $0\leq q<3$ and $m+n+q=3$.

Concrete examples of the aluminum compounds having the formula (1) include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented by, for example, the formula of $R^1{}_{2.5}Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as alkylaluminum dihalides such as ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as alkylaluminum dihydride, for example, ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

Furthermore, the organoaluminum compounds similar to the above-mentioned compounds represented by formula (i) include organoaluminum compounds in which two or more aluminum atoms are bonded together via, for example, an oxygen atom or a nitrogen atom. Concrete examples of such compounds are as follows:

and

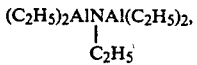

and methylaluminoxane.

Examples of the organoaluminum compounds having the formula (ii) include

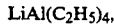

and

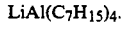

Among the above-exemplified compounds, particularly preferred are trialkylaluminum compounds and alkylaluminum compounds in which two or more aluminum compounds are bonded together.

Examples of the compound represented by the above-mentioned formula (3) are diethylzinc and diethylmagnesium. Further, alkylmagnesium halides such as ethylmagnesium chloride is also usable.

Of the compounds represented by the above-mentioned formulas (1), (2) and (3), respectively, particularly preferred are trialkylaluminum, alkylaluminum halides or mixtures thereof.

Polymerization of olefin with the olefin polymerization catalyst containing the above-mentioned components [A] and [B] in the present invention is not limited only to copolymerization of ethylene and pentene-1, but it also includes copolymerization of three or more components, for example, ethylene, pentene-1 and small amounts of other α-olefins or polyenes copolymerizable therewith. The other α-olefins olefins usable in this copolymerization include, for example, 2-methylpropylene, 1-butene, 1-hexene, 4-methyl-1-pentene, 3-methyl-1-pentene, 1-octene, 1-nonene, 1-decene, 1-undecene, and 1-dodecene. Further, the polyenes include, for example, butadiene, isoprene, 1,4-hexadiene, dicyclopentadiene and 5-ethylidene-2-norbornene.

The ethylene/pentene-1 copolymers [I] used in the present invention may be prepared using the above-mentioned catalysts by vapor phase polymerization as melt be mentioned ester.

The vapor phase polymerization of ethylene and pentene-1 is carried out using a polymerizer equipped with a fluidized bed reactor or a stirring fluidized bed reactor. In this case, the solid titanium catalyst component [A] is used, as it is, or used as a suspension thereof in a hydrocarbon medium or olefin, and the organometallic compound catalyst component [B], either diluted or not diluted, is fed to the polymerization system.

Further, the molecular weight of the resulting polymer can be modified by the addition of hydrogen to the polymerization system.

In the present invention, it is preferable to use a pre-polymerized catalyst. In carrying out the pre-polymerization, the above-mentioned electron donor catalyst component may be present in the system in addition to the above-mentioned catalyst component [A] and organometallic compound catalyst component [B]. In that case, the electron donor catalyst component may be used in an amount, based on 1 gram atom of titanium of the titanium catalyst component [A], of 0.01–30 moles, preferably 0.1–10 moles and especially 0.5–5 moles. In the pre-polymerization, α-olefin of 2–10 carbon atoms is pre-polymerized in an inert hydrocarbon solvent, using a liquid monomer as a solvent or without using any solvent. It is preferable, however, to carry out the pre-polymerization in the inert hydrocarbon solvent.

The amount of the α-olefin polymer resulting from the pre-polymerization is, based on 1 g of the titanium catalyst component, 0.5–5000 g, preferably 1–1000 g and especially 3–200 g.

The inert hydrocarbon solvent used in the pre-polymerization includes aliphatic hydrocarbons such as propane, butane, n-pentane, isopentane, n-hexane, isohexane, n-heptane, n-octane, isooctane, n-decane, n-dodecane and kerosine; alicyclic hydrocarbons such as cyclopentane, methylcyclopentane, cyclohexane and methylcyclohexane; aromatic hydrocarbons such as benzene, toluene and xylene; and halogenated hydrocarbons such as methylene chloride, ethyl chloride, ethylene chloride and chlorobenzene, and of these hydrocarbons exemplified above, preferred are aliphatic hydrocarbons, particularly those of 3–10 carbon atoms.

In the case where a non-active solvent or liquid monomer is used in the pre-polymerization, the amount of the titanium catalyst component [A] is, in the term of titanium atom, 0.001 to 500 mmol, preferably 0.005 to 200 mmol per 1 liter solvent, and the organometallic compound catalyst component [B] is used in an amount that Al/Ti (atomic ratio) of 0.5 to 500, preferably 1.0 to 50, and especially 2.0 to 20.

The α-olefin used in the pre-polymerization includes those of not more than 10 carbon atoms such as ethylene, propylene, 1-butene, 1-pentene, 4-methyl-1-pentene, 3-methyl-1-pentene, 1-heptene, 1-octene and 1-decene. Of these α-olefins, preferred is ethylene. In carrying out the pre-polymerization, these α-olefins may be homopolymerized on the catalyst component or may be copolymerized thereon so long as the polymer to be prepared using this pre-copolymerized catalyst component is a crystalline polymer.

The polymerization temperature employed in the pre-polymerization varies according to the kind of α-olefin used or to the kind of an inert hydrocarbon solvent used, and cannot be defined indiscriminately. Generally, however, the polymerization temperature is from −40° to 80° C., preferably from −20° to 40° C. and especially from −10° to 30° C.

In the pre-polymerization, hydrogen may coexist with the polymerization system.

In the process mentioned above, copolymerization of ethylene and pentene-1 is carried out using preferably the pre-polymerized catalyst as mentioned above. In the copolymerization of ethylene and pentene-1, the ethylene/pentene-1 copolymer [I] is prepared so as to amount to 1,000–100,000 g, preferably 2,000–50,000 g and especially 3,000–30,000 g per 1 gram of the titanium catalyst component [A] contained in the aforesaid catalyst on which α-olefin has been pre-polymerized.

The amount, based on 1 gram atom of titanium in the titanium catalyst component [A], of the organometallic compound catalyst component [B] used in the pre-polymerized catalyst is 1–1000 moles, preferably 3–500 moles and especially 5–100 moles. In that case, other compounds such as an electron donor catalyst component may be used, and the amount, based on 1 gram atom of the metallic atom in the organometallic compound component [B], of the electron donor catalyst component is not more than 100 moles, preferably not more than 1 mole and especially from 0.001 to 0.1 mole.

In the copolymerization mentioned above, the polymerization temperature employed is 20°–130° C., preferably 50°–120° C. and especially 70°–110° C., and the polymerization pressure is 1–50 kg/cm², preferably 2–30 kg/cm² and especially 5–20 kg/cm². Further, an inert gas such as methane, ethane, propane, butane or nitrogen may suitably injected into the polymerization system so as to maintain a vaporous condition inside the system.

In the process of polymerization mentioned above, the polymerization may be carried out by any of the batchwise, semi-continuous and continuous methods.

Ethylene/pentene-1 copolymers used in the invention include not only the ethylene/pentene-1 copolymers [I] obtained by the above-mentioned process but also ethylene/pentene-1 copolymers obtained by processes other than the above-mentioned process or mixtures thereof. The ethylene/pentene-1 copolymers obtained by the other processes are illustrated below.

The ethylene/pentene-1 copolymer used in the invention is heated up to 200° C. to a molten state, and the melt is cooled at a cooling rate of 10° C./min and crystallized to obtain a sheet of 0.5 mm in thickness as a sample. The sample is then heated from 10° C. up to 200° C. at a heating rate of 10° C. by means of DSC to obtain a DSC melt-peak pattern having three melt peaks (FIG. 2). In contrast thereto, the ethylene/pentene-1 copolymer used in the invention is heated up to 200° C. to a molten state, and the melt is ultra-slowly cooled down to 50° C. at a cooling rate of 0.31° C. and crystallized to obtain a sheet of 0.5 mm in thickness as a sample (hereinafter the sample thus obtained is called "the ultra-slowly cooled sample"). The sample is then heated from 10° C. up to 200° C. at a heating rate of 10° C./min by means of DSC to obtain a DSC melt-peak pattern. The DSC melt-peak pattern of the ultra-slowly cooled sample has two melt-peaks, wherein the ratio of Hh/Hl (Hh is a peak height on the higher temperature side and Hl is a peak height on the lower temperature side) and the density d of the copolymer satisfy the following formula (FIG. 1).

$$0 < Hh/Hl < 80d - 69.0$$

Of the ethylene/pentene-1 copolymers having such DSC characteristics as mentioned above, the copolymers (hereinafter called the ethylene/pentene-1 copolymers [II]) in which the Hh/Hl ratio satisfies $$60d - 52.0 < Hh/Hl < 80d - 69.0,$$

and the copolymers (hereinafter called the ethylene/pentene-1 copolymers [II]) in which the Hh/Hl ratio satisfies $$0 < Hh/Hl < 60d - 52.0$$

may be prepared selectively by suitably selecting the reaction conditions or the catalysts used therefor.

Accordingly, in the preparation of the ethylene/pentene-1 copolymer compositions of the present invention, the use of the ethylene/pentene-1 copolymers [I] obtained by the process mentioned previously, or the use of ethylene/pentene-1 copolymers [II] or [III] obtained by the processes as will be mentioned later can suitably selected according to the purposes for which the compositions of the invention are used or depending upon the economical requirement, and these copolymers may be used in combination if desired.

The ethylene/pentene-1 copolymers [II] may be prepared by the so-called "vapor phase polymerization", and the ethylene/pentene-1 copolymers [III] may be prepared by the so-called "solution polymerization".

Illustrated below in detail are the ethylene/pentene-1 copolymers [II], and illustration in detail of the ethylene/pentene-1 copolymers [III] will follow.

The ethylene/pentene-1 copolymers [II] may also be further copolymerized with the same α-olefins or polyenes other than ethylene and pentene-1 as used in the aforementioned ethylene/pentene-1 copolymers [I].

The ethylene/pentene-1 copolymers [II] have a melt flow rate (MFR) of 0.01 to 100 g/10 min, preferably 0.05 to 50 g/10 min. If this MFR of the copolymer is less than 0.01 g/10 min, said copolymer tends to deteriorate in moldablity, and molded articles, such as a film, obtained form the copolymer tend to deteriorate in transparency. Id this MFR of the copolymer exceeds 100 g/10 min, said copolymer tends to deteriorate in mechanical strength.

The ethylene/pentene-1 copolymers [II] have a density of 0.88 to 0.95 g/cm$^3$, preferably 0.89 to 0.94 g/cm$^3$.

The ethylene/pentene-1 copolymers [II] contain 2 to 25% by weight, preferably 4 to 23% by weight and especially 6 to 20% by weight of a stuctural unit derived from pentene-1 and 75 to 98% by weight, preferably 77 to 96% by weight and especially 80 to 94% by weight of a structural unit derived from ethylene.

The ethylene/pentene-1 copolymers [II] may further contain, as mentioned previously, not more than 10% by weight, preferably not more than 5% by weight and especially not more than 3% by weight of a structural unit derived from one of α-olefins other than ethylene and pentene-1.

Furthermore, the Hh/Hl ratio measured from the DSC melt-peak pattern of "the ultra-slowly cooled sample" of the ethylene/pentene-1 copolymer [II] and the density d of said copolymer [II] satisfy the following formula.

$$60d - 52.0 < Hh/Hl < 80d - 69.0 \quad [5],$$

Preferably, $$60d - 52.0 < Hh/Hl < 80d - 69.1 \quad [5'],$$

especially, $$60d - 51.9 < Hh/Hl < 80d - 69.2 \quad [5''],$$

wherein Hh represents a peak height on the higher temperature side, Hl represents a peak height on the lower temperature side, and d is the density of the copolymer.

The ratio (RS) of the impact strength of a film of 40 μm in thickness to the tear strength of the film in the take-off direction satisfies the following formula [6], said film being obtained by casting the ethylene/pentene-1 copolymer [II] having the above-mentioned characteristics according to the invention.

$$RS \geq -20 \log MFR - 1000d + 968 \quad [6],$$

wherein MFR is the melt flow rate of the copolymer and d is the density of the copolymer.
Preferably, $$RS \geq -20 \log MFR - 1000d + 973 \quad [6'],$$

and especially, $$200 \geq RS \geq -20 \log MFR - 1000d + 975 \quad [6''].$$

When the ratio (RS) of the impact strength to the tear strength mentioned above is less than ($-20 \log MFR - 1000d + 968$), the resulting film has poor tear properties, though it has a high impact strength, or the resulting film is inferior in impact strength, though it has good tear properties.

The cast film of 40 μm in thickness, obtained by processing the above-mentioned copolymer[II] in the manner mentioned above has an impact strength of usually not lower than 1000 kg·cm/cm, preferably not lower than 1200 kg·cm/cm.

It is desirable that the tear strength ($T_{MD}$) of the above-mentioned film in the take-off direction and the melt flow rate (MFR) of the ethylene/pentene-1 copolymer [II] satisfy the relationship represented by the following formula [7].

$$\log T_{MD} \leq -0.37 \log MFR - 5.1d + 6.72 \quad [7],$$

preferably, $$\log T_{MD} \leq -0.37 \log MFR - 5.1d + 6.65 \quad [7'],$$

and especially, $$\log T_{MD} \leq -0.37 \log MFR - 5.1d + 6.59 \quad [7''].$$

Films excellent in impact strength as well as tear properties can be obtained from the ethylene/pentene-1 copolymers [II] which satisfy the relationship represented by the above formula [7] with respect to the tear strength ($T_{MD}$) of the film in the take-off direction and MFR.

Pressed sheets of 2 mm in thickness obtained by molding the ethylene/pentene-1 copolymers [II] having MFR of 2.0 to 50 g/10 min according to ASTM D 1928 have stress cracking resistance [SC resistance (ESCR), measured according to ASTM D 1692, antalocks 100%, 50° C.] of at least 10 hr, and satisfy the relationship represented by the following formula [8-a].

$$ESCR \geq 0.7 \times 10^4 (\log 80 - \log MFR)^3 (0.952-d) \quad [8-a]$$

wherein $2.0 \leq MFR \leq 50$ and d represents the density of the copolymer, preferably $$ESCR \geq 0.9 \times 10^4 (\log 80 - \log MFR)^3 (0.952-d) \quad [8'-a]$$

and especially $$ESCR \geq 1.1 \times 10^4 (\log 80 - \log MFR)^3 (0.952-d) \quad [8''-a]$$

Further, pressed sheets of 2 mm in thickness, obtained by molding the ethylene/pentene-1 copolymers [II] having MFR of 1.0 to 20 g/10 min according to ASTM D 1928 have stress cracking resistance [SC resistance (ESCR) measured according to ASTM D 1692, antalocks 10%, 50° C.] of at least 20 hr and satisfy the relationship represented by the following formula [8-b].

$$ESCR \geq 1.4 \times 10^4 (\log 40 - \log MFR)^2 (0.952-d) \quad [8-b]$$

wherein $1.0 \leq MFR \leq 20$ and d represents the density of the copolymer preferably $$ESCR \geq 1.7 \times 10^4 (\log 40 - \log MFR)^2 (0.952-d) \quad [8'-b]$$

and especially $$ESCR \geq 2.0 \times 10^4 (\log 40 - \log MFR)^2 (0.952-d) \quad [8''-a]$$

Furthermore, pressed sheets of 2 mm in thickness, obtained by molding the ethylene/pentene-1 copolymers [II] having MFR of 0.1 to 5 g/10 min according to ASTM D 1928 have stress cracking resistance [SC resistance (ESCR), measured according to ASTM D 1692, antalocks 10%, 60° C.] of at least 50 hr and satisfy the relationship represented by the following formula [8-c].

$$ESCR \geq 0.50 \times 10^4 (\log 100 - \log MFR)(0.952-d) \quad [8-c],$$

wherein $0.1 \leq MFR \leq 5$, and d represents the density of the copolymer preferably $$ESCR \geq 0.65 \times 10^4 (\log 100 - \log MFR)(0.952-d) \quad [8'-c],$$

and especially $$ESCR \geq 0.80 \times 10^4 (\log 100 - \log MFR)(0.952-d) \quad [8''-c].$$

Moreover, it is desirable that the haze (HAZE) of the above-mentioned pressed sheets and the melt flow rate (MFR) of the ethylene/pentene-1 copolymers [II] satisfy the relationship represented by the following formula [9].

$$\log \text{HAZE} \leq 15d - 0.45 \log \text{MFR} - 12.23 \quad [9]$$

wherein d represents the density of the copolymer, preferably $$\log \text{HAZE} \leq 15d - 0.45 \log \text{MFR} - 12.26 \quad [9']$$

and especially $$\log \text{HAZE} \leq 15d - 0.45 \log \text{MFR} - 12.30 \quad [9''].$$

The press sheets of 0.1 mm in thickness, used for the measurement of the above-mentioned physical properties were prepared from the ethylene/pentene-1 copolymers [II] according to ASTM D 1928.

The measurement of the value of HAZE was conducted according to ASTM D 1003.

The process for the preparation of ethylene/pentene-1 copolymers [II] is illustrated hereinafter.

The ethylene/pentene-1 copolymers [II] may be prepared by copolymerizing ethylene and pentene-1 under specific conditions in the presence of such olefin polymerization catalysts as will be mentioned below.

The olefin polymerization catalysts used in the process for the preparation of the ethylene/pentene-1 copolymers [II] may include, for example, an olefin polymerization catalyst containing a solid titanium catalyst component [A] for olefin polymerization obtained by reaction of a hydrocarbon-insoluble solid magnesium aluminum composite selected from ($A_1$) or ($A_2$) mentioned below and a tetravalent titanium compound and containing at least titanium atoms in a low valent state in the proportion of more than 10% and having OR group in an amount of from 1 to 15 in terms of OR/Mg (weight ratio) and an organoaluminum compound catalyst component [B], said ($A_1$) representing a solid magnesium.aluminum composite having $R^1O$ group and $R^2$ group ($R^1$ and $R^2$ are each a hydrocarbon residue) obtained from a liquid magnesium compound formed from a mixture containing a magnesium compound and an electron donor or a liquid magnesium compound formed from a solution of a magnesium compound in hydrocarbon solvent, and said ($A^2$) representing a solid magnesium aluminum composite containing $R^1O$ group and $R^3$ group ($R^3$ is a hydrocarbon residue) obtained by reaction of a solid magnesium compound (B) containing $R^1O$ group or $R^1OH$ group obtained from a liquid magnesium compound formed from a mixture containing a magnesium compound and an electron donor or a liquid magnesium compound formed from a solution of a magnesium compound in hydrocarbon solvent or the above-mentioned ($A_1$) with an organometallic compound (C) of a metal belonging to the group I through III of the periodic table.

Hereinafter, this olefin polymerization catalyst and the reaction system using said catalyst are illustrated. In this connection, however, the way of preparing the ethylene/pentene-1 copolymers [II] is not limited only to the catalyst and reaction system using the same, but said copolymer can be prepared by using other catalysts or other reaction systems.

The above-mentioned olefin polymerization solid titanium catalyst component [A] is typically a component carrying a low valent titanium thereon obtained by reaction of a magnesium.aluminum composite having $R^1O$ group and a hydrocarbon residue obtained by reaction among a liquid magnesium compound as a starting material, an organoaluminum compound, a $R^1O$ group ($R^1$ is a hydrocarbon residue) forming compound and optionally other reaction reagent with a tetravalent titanium compound.

The liquid magnesium compound used above may be, for example, a solution of the magnesium compound in hydrocarbon, electron donor or mixture thereof, or may be a melt of the magnesium compound. The magnesium compound used for this purpose includes halogenated magnesium such as magnesium chloride, magnesium bromide, magnesium iodide or magnesium fluoride; alkoxy magnesium halide such as methoxy magnesium chloride, ethoxy magnesium chloride, isopropoxymagnesium chloride, butoxy magnesium chloride or octoxy magnesium chloride; aryloxy magnesium halide such as phenoxy magnesium chloride or methylphenoxy magnesium chloride; alkoxy magnesium such as ethoxy magnesium, isopropoxy magnesium, butoxy magnesium or octoxy magnesium; aryloxy magnesium such as phenoxy magnesium or dimethylphenoxy magnesium; and magnesium carboxylate such as magnesium laurate or magnesium stearate. The magnesium compounds used herein may also be complex or composite compounds of the above-mention magnesium compounds with other metals, or mixtures thereof. Further, the magnesium compounds used herein may also be mixtures of two or more of these compounds exemplified above.

Of these magnesium compounds exemplified above, preferred are those represented by $MgX_2$, $Mg(OR^5)X$ or $Mg(OR^5)_2$ (wherein X is halogen and $R^5$ is a hydrocarbon residue) such as halogenated magnesium, alkoxy magnesium halide, aryloxy magnesium halide, alkoxy magnesium or arloxy magnesium. Of the halogen containing magnesium compounds, preferred are magnesium chloride, alkoxy magnesium halide and aryloxy magnesium halide, and especially preferred is magnesium chloride.

The liquid magnesium compound mentioned above is suitably a solution of said magnesium compound in a hydrocarbon solvent or an electron donor, in which said magnesium compound is soluble, or in a mixture thereof. The hydrocarbon solvent used for this purpose includes aliphatic hydrocarbons such as pentene, hexane, heptane, octane, decane, dodecane, tetradecane and kerosine; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

The solution of the magnesium compound in the hydrocarbon solvent may be obtained by various methods, though they vary according to the kind of the magnesium compound and the solvent used, such as a method wherein the two compounds are simply mixed together (for example using $Mg(OR^5)_2$ in which $R^5$ is a hydrocarbon residue having 6-20 carbon atoms as the magnesium compound), and a method wherein the magnesium compound is mixed with the hydrocarbon solvent in the presence of an electron donor in which said magnesium compound is soluble, for example, alcohol, aldehyde, amine, carboxylic acid or a mixture thereof, or a mixture comprising said mixture and other electron donor, and the resulting mixture is heated if necessary. For example, when a halogen containing magnesium compound is dissolved in the hydrocarbon solvent using alcohol, the amount of the alcohol used, though it varies according to the kind and amount of the hydrocarbon solvent used and to the kind of magnesium compound used, is preferably more than about 1 mole, suitably from about 1 to about 20 moles, more suitably from about 1.5 to about 12 moles, per 1 mole of the halogen containing magnesium compound. When an aliphatic hydrocarbon and/or an alicyclic hydrocarbon is used as the hydrocarbon solvent in the above case, alcohol is used in the proportion as defined above, wherein the halogen containing magnesium compound can be solubilized by the use of a relatively small amount of the alcohol, for example, using alcohol having more than 6 carbon atoms in combination with said alcohol in an amount, based on 1 mole of the halogen containing magnesium compound, of more than about 1 mole, preferably more than about 1.5 moles, and the resulting catalyst component comes to have a good shape. For example, when alcohol having not more than 5 carbon atoms is used alone in the above case, it is necessary to use more than about 15 moles of the alcohol per mole of the halogen containing magnesium compound, and no shape of the resulting catalyst component is comparable to that of the catalyst component obtained in the above case. On the one hand, the halogen containing magnesium compound becomes soluble in an aromatic hydrocarbon by the use of alcohol in such an amount as defined above, irrespective of the kind of the alcohol used.

The halogen containing magnesium compound and alcohol are brought into contact with each other in a hydrocarbon solvent at a temperature above room temperature and, according to the kind of the alcohol and hydrocarbon solvent used, at a temperature of higher than about 65° C., suitably about 80°–300° C. and more suitably from about 100° to about 200° C. for a period of from about 15 minutes to about 5 hours, preferably from about 30 minutes to about 2 hours.

Preferable as the alcohol used in that case are those having not less than 6 carbon atoms, for example, aliphatic alcohol such as 2-methylpentanol, 2-ethylpentanol, n-heptanol, n-octanol, 2-ethylhexanol, decanol, dodecanol, tetradecyl alcohol, undecenol, oleyl alcohol or stearyl alcohol; alicyclic alcohol such as cyclohexanol or methylcyclohexanol; aromatic alcohol such as benzyl alcohol, methylbenzyl alcohol, α-methylbenzyl alcohol or α,α-dimethylbenzyl alcohol; alkoxy-containing aliphatic alcohol such as n-butyl cellosolve or 1-butoxy-2-propanol. Examples of other alcohol include those having not more than 5 carbon atoms such as methanol, ethanol, propanol, butanol, ethylene glycol and methylcarboitol.

The magnesium compound may also be dissolved in an electron donor other than alcohol. Preferred examples of the electron donor used in this case include amine, aldehyde and carboxylic acid, and examples of an electron donor other than those mentioned above include phenol, ketone, ester, ether, amide, acid anhydride, acid halide, nitrile and isocyanate. The magnesium compound may be dissolved in the electron donor as exemplified above under the conditions similar to those employed in the case of dissolving the magnesium compound in the hydrocarbon solvent using the electron donor. In this case, however, the system must be maintained at a relatively high temperature and, therefore, from the technical viewpoint of the preparation of catalyst, the catalyst component of high performance is easily obtained when the solution of the magnesium compound in the hydrocarbon solvent is used.

Examples of the liquid magnesium compound include melts of the magnesium compounds. A typical example of the melts is, for example, a melt of a complex of halogenated magnesium with such an electron donor as exemplified previously. Suitable as the melt referred to herein is a melt of a halogenated magnesium.alcohol complex represented by $MgX_2 nR^1OH$ ($R^1$ is a hydrocarbon residue, and n is a positive number).

Stated below is the process for the preparation of a solid magnesium aluminum composite having $R^1O$ group and $R^3$ group (or $R^2$ group)($R^1$, $R^2$ and $R^3$ are each a hydrocarbon residue, and $R^3$ (or $R^2$) is a reducing group bonded directly to magnesium of aluminum atom) from the liquid magnesium compound. The magnesium aluminum composite referred to herein is represented by the empirical formula $Mg_a Al_b R^2_c$ (or $R^3 c$)$(OR^1)_d X^2_e$ wherein $X^2$ is halogen, and $2a+3b=c+d+e$. Under certain circumstances, other compounds or electron donors may be bonded to this complex. In this magnesium aluminum complex represented by the above-mention empirical formula, Al/Mg (atomic ratio) is 0.05–1, preferably 0.08–0.5 and especially 0.12–0.3, $R^1O$ group is in an amount, based on 1 part by weight of magnesium, of 0.5–15 parts by weight, preferably 1–10 parts by weight and especially 2–6 parts by weight, the hydrocarbon residue $R^2$ (or $R^3$) is in an amount, based on 1 magnesium atom, of 0.01–0.5 equivalent, preferably 0.03–0.3 equivalent and especially 0.05–0.2 equivalent, and $X^2/Mg$ (atomic ratio) is 1–3, preferably 1.5–2.5.

The process for the preparation of the above-mentioned magnesium aluminum composite is illustrated below in details.

The magnesium aluminum composite is prepared by a process wherein the liquid magnesium compound and an organoaluminium compound are brought into contact with each other to obtain directly said composite.

In this process, at least one of the liquid magnesium compound and organoaluminum compound used is a compound having $R^1O$ group or $R^1O$ group forming compound, e.g. a compound having $R^1OH$ group and, at the same time, a halogen compound must be used.

For example, the desired magnesium composite may be obtained by the reaction between $MgX_2$ and alcohol, preferably the reaction between the solution of the magnesium compound containing a hydrocarbon and an alkylaluminum compound, or the reaction between $Mg(OR^5)X$ or $Mg(OR^5)_2$ and alcohol, preferably by the reaction between the solution of the magnesium compound containing a hydrocarbon or a solution of $Mg(OR^5)_2$ in a hydrocarbon and alkylaluminum halide.

The alkylaluminum compound referred to above includes trialkylaluminum such as triethylaluminum or tributylaluminum; trialkenylaluminum such as triisoprenylaluminum; dialkylaluminum alkoxide such as diethylaluminum ethoxide or dibutylaluminum butoxide; alkylaluminum sesquialkoxide such as ethylaluminum sesquiethoxide or butylaluminum sesquibutoxide; alkoxylated alkylaluminum having an average composition represented by $R^1_{2.5} Al(OR^2)_{0.5}$; dialkylaluminum halide such as diethylaluminum chloride, dibutylaluminum chloride or diethylaluminum bromide; alkylaluminum sesquihalide such as ethylaluminum sesquichloride, butylaluminum sesquichloride or ethylaluminum sesquibromide; partially halogenated alkylaluminum such as alkylaluminum dihalide, for example, ethylaluminum dichloride, propylaluminum dichloride or butylaluminum dibromide; dialkylaluminum hydride such as diethylaluminum hydride or dibutylaluminum hydride; partially hydrogenated alkylaluminum such as alkylaluminum dihydride, for example, ethylaluminum dihydride or propylaluminum dihydride; and partially alkoxylated and halogenated alkylaluminum such as ethylaluminum ethoxychloride, butylaluminum butoxychloride or ethylaluminum ethoxybromide.

Further, alkylaluminum halide may be selected from among the halogen containing alkylaluminum compounds as exemplified above.

The process for the preparation of the magnesium aluminum composite as illustrated above includes not only a process which comprises bringing the liquid magnesium compound into contact with the alkylaluminum compound in one stage as aforesaid, but also a process which involves a multi-stage contact between the liquid magnesium compound and the alkylaluminum compound, wherein said liquid magnesium compound is first brought into contact with part of said alkylaluminum compound to form a solid magnesium compound, followed by further contact of said solid magnesium compound with an alkylaluminum compound which is the same as or different from the alkylaluminum compound first used. Usually, of the two processes mentioned above, the latter is better than the former, because a particle diameter of the resulting composite or the amount of organic group contained therein can easily be adjusted, and eventually it becomes easy to obtain the desired catalyst of high performance.

In the process involving such a multi-stage contact as mentioned above, it is also possible that after completion of the first-stage contact, the solid magnesium compound formed thereby is separated from the liquid system, and the thus separated solid magnesium compound proceeds to the subsequent reaction in the second stage-contact.

Eventually, it is desirable to design that the solid magnesium aluminum composite obtained by the above-mentioned processes will come to have such composition as defined previously. For this purpose, it is preferable to use the alkylaluminum compound in an appropriate amount at the time of effecting the above-mentioned contact between the liquid magnesium compound and said alkylaluminum compound. For example, in the process involving the multi-stage contact as aforesaid, when a solution using alcohol is used as the liquid magnesium compound, the alkylaluminum compound is used in such an amount that $R^2$—Al bond of said alkylaluminum compound is more than 0.5 eqivalent based on 1 equivalent of the hydroxyl group of said alcohol. When the amount of the alkylaluminum compound used is excessively large, the resulting solid component deteriorates in shape, and no granular composite is obtained sometimes. On that account, the alkylaluminum compound is used in such an amount, based on 1 equivalent of the hydroxyl group of the alcohol, of 0.5-10 equivalent, preferably 0.7-5 equivalent, further preferably 0.9-3 euivalent and especially 1.0-2 euivalent in terms of $R^2$—Al bond.

In that case, it is preferable to use trialkylaluminum as the alkylaluminum compound, because the solid composite having a good shape is easy to obtain. Other preferred organoaluminum compounds are dialkylaluminum halide, dialkylaluminum hydride and dialkylaluminum alkoxide.

In the contact between the liquid magnesium compound and alkylaluminum compound, the concentration in the liquid system of the magnesium compound is 0.005-2 mol/l, especially 0.05-1 mol/l.

Separation of the magnesium compound takes place, for example, an insoluble magnesium compound is formed by the reaction of alkylaluminum compound with alcohol. When the separation of the magnesium compound proceeds so rapidly, it is sometimes difficult to obtain the solid composite excellent in shape and having an appropriate particle diameter and a narrow particle size distribution, accordingly the thus separated solid composited cannot sometimes be the optimum carrier for slurry polymerization catalyst. On that account, it is desirable that the above-mentioned contact is effected under mild conditions, taking account of the contact temperature, the amount of the alkylaluminum compound added at the time of separation of the solid or the rate of addition of the alkylaluminum compound or concentration of each compound used.

From the reasons cited above, it is preferable to effect the contact of the liquid magnesium compound with the organoaluminum compound at a temperature of from $-50°$ to $100°$ C., especially from $-30°$ to $50°$ C., followed by reaction at a temperature of from $0°$ to $200°$ C., preferably from $40°$ to $150°$ C. When the solid magnesium compound is first formed, and the solid magnesium compound thus formed is then brought into contact with the alkylaluminum compound to effect the reaction as aforesaid, the reaction temperature employed therefor is from $0°$ to $250°$ C., especially from $20°$ to $130°$ C.

In either case, the contact and reaction conditions employed are so designed that RO group and $R^2$ group of the resulting solid magnesium aluminum composite respectively come within the range as defined previously and, at the same time, it is also desirable to select these conditions so that the resulting composite has a particle diameter of more than 1 $\mu$m, especially more than 5 $\mu$m but not more than 100 $\mu$m, a particles size distribution of 1.0-2.0 in terms of geometric standard deviation and said compound will come to have a spherical or granular shape.

Further, the solid magnesium aluminum composite may be prepared by using an organometallic compound of a metal other than aluminum belonging to the group I-III of the periodic table, for example, alkyllithium, alkylmagnesium halide or dialkylmagnesium, instead of the alkylaluminum compound, with which the solid magnesium compound first separated is brought into contact.

The solid magnesium aluminum composite may be prepared by other processes than those mentioned previously, for example, a preocess in which a halogenation agent such as chlorine, hydrogen chloride silicon tetrachloride or halogenated hydrocarbon is used in any stage where the alkylaluminum compound is used in the previously mentioned processes, a process in which a halogenation agent is used before or after the use of the alkylaluminum compound. These processes mentioned above are useful in substitution of the process using alkylaluminum halide.

The process using the halogenation agent prior to the use of the alkylaluminum compound is useful as a means for forming a solid magnesium compound containing R$^1$O group or R$^1$OH group from a liquid magnesium compound, and the desired solid magnesium aluminum composite may be prepared by reaction of the thus formed solid magnesium compound with the alkylaluminum compound. For example, the above-mentioned solid magnesium compound may be prepared by reaction of MgX$_2$, Mg(OR$^5$)X or Mg(OR$^5$)$_2$ with alcohol, preferably with a solution containing a hydrocarbon and the halogenation agent, or by reaction of hydrocarbon solvent containing Mg(OR$^5$)$_2$ with the halogenation agent. The solid magnesium compound thus prepared is represented by the empirical formula MgX$_{2-q}$(OR$^5$)$_q$·nR$^6$OH ($0 \leq q < 2$, $n \geq 0$), and optionally forms a composite with other compound component in some cases. In this process, the reactants are used in such a proportion that halogen will amount to about 1-1000 equivalent per 1 atom of magnesium present in the magnesium compound. The reaction between the solid magnesium compound thus prepared and the alkylaluminum compound may be carried out in accordance with the procedure of the last stage of the above-mentioned process involving the multi-stage contact between the solid magnesium compound and the alkylaluminum compound.

The solid magnesium compound as mentioned above may also be prepared by other process than those illustrated above, in which the magnesium compound of the formula MgX$_{2-q}$(OR$^5$)$_q$·nR$^6$OH in a molten state is solidified by cooling, preferably said molten magnesium compound is dispersed in a hydrocarbon medium and then solidified by cooling.

In any of the processes mentioned above, it is preferable to select the separation conditions under which the solid magnesium compound is separated so that the resulting solid magnesium compound has a particle diameter of more than 1 μm, especially more than 5 μm but not more than 100 μm, and a particle size distribution of 1.0-2.0 in terms of geometric standard deviation, and said compound will come to have a spherical or granular shape.

The amount of the reducing group R$^2$ or R$^3$ contained in the solid magnesium aluminum composite obtained by the processes mentioned above is determined in the following manner.

To a closed flask of about 200 ml capacity thoroughly purged with dry nitrogen and charged with about 0.5 g of a solid magnesium aluminum composite is gradually added dropwise with stirring about 25 ml of water. After the lapse of about 20 minutes, the vapor phase and water phase portion in the flask were respectively with drawn by means of a microsyringe, followed by determination of the alkane concentration of each portion by gas chromatography. The measured value of the alkane concentration in each portion is multiplied by a value of the volume of each portion, and the products thus obtained were then combined to obtain a total amount of alkane formed. This total amount is regarded as the total amount of the alkane formed by reaction of the alkyl group present in said composite with water, and can be considered to be the amount of the reducing group present in said composite.

The thus obtained solid magnesium aluminum composite having R$^1$O group and the organic reducing group is brought into contact with a tetravalent titanium compound used in such a proportion that Ti/Mg (atomic ratio) is less than 1, preferably 0.01-0.7 and especially 0.04-0.5 to prepare a soild titanium compound. At least a part of titanium supported on this compound has been reduced to a low valent state, for example, three valences.

There are various tetravalent titanium compounds used for the preparation of the solid titanium component [A], but usually used are those represented by Ti(OR)$_g$X$_{4-g}$ wherein R is a hydrocarbon residue, X is halogen atom, and $0 \leq g \leq 4$. More concretely, useful tetravalent titanium compounds include titanium tetrahalide such as TiCl$_4$, TiBr$_4$ TiI$_4$; alkoxy titanium trihalide such as Ti(OCH$_3$)Cl$_3$, Ti(OC$_2$H$_5$)Cl$_3$, Ti(O—n—C$_4$H$_9$)Cl$_3$, Ti(OC$_2$H$_5$)Br$_3$ or Ti(O—iso—C$_4$H$_9$) Br$_3$; dialkoxy titanium dihalide such as Ti(OCH$_3$)$_2$Cl$_2$, Ti(OC$_2$H$_5$)Cl$_2$, Ti(O—n—C$_4$H$_9$)$_2$Cl$_2$ or Ti(OC$_2$H$_5$)$_2$Br$_2$; trialkoxy titanium monohalide such as Ti(OCH$_3$)$_4$, Ti(OC$_2$H$_5$)$_4$, Ti(O—n—C$_4$H$_9$)$_4$or Ti(O—2-ethylhexyl)$_4$. Of these tetravalent titanium compound as exemplified above, preferred are titanium tetrahalide and alkoxy titanium trihalide, and particularly the use of alkoxy titanium trihalde is preferable.

The catalystic reaction of the solid titanium aluminum composite with the titanium compound is carried out preferably in a hydrocarbon medium under the conditions selected so that in the end solid titanium catalyst component resulting from the contact with the titanium compound, R$^7$O group/Mg weight ratio (R$^7$ is a hydrocarbon residue) is 0.5-15, preferably 1-10 and especially 2-6. Herein R$^7$O group is derived from R$^1$O group present in the solid magnesium aluminum composite or the titanium compound. When the content of R$^7$O group in the solid catalyst component is smaller than the above-defined range, slurry polymerizability in the copolymerization of ethylene is poor, and eventually the resulting ethylene copolymer comes to have not a sufficiently narrow composition distribution. If the the content of R$^7$O group is larger than the above-defined range, catalyst component tends to decrease in activity.

The content of R$^7$O group in the titanium catalyst compoenet may be adjusted to the above-mentioned range by selecting the kind and amount of the titanium campound used and the temperature at which the contact of the solid magnesium aluminum composite and the titanium compound is effected. The contact temperature at which the titanium compound is brought into contact with the solid magnesium aluminum composite is usually about 0°-200° C., preferably about 20°-100° C.

In forming the above-mentioned solid product, a porous inorganic and/or organic compound may be allowed to coexist with the starting reactants in the reaction system, thereby depositing the resulting solid product on the surface of said porous compound. In this case, it is also possible that the porous compound is brought into contact in advance with the liquid magnesium compound, and the porous compound containing and retaining said liquid magnesium compound is then brought into contact with the liquid titanium compound. Examples of these useful porous compounds include silica, alumina magnesia polyolefin and these compound treated with halogen containing compound. However, when a porous compound containing aluminum, magnesium and RO group which are essential components of the present catalyst component is used in the above case, the resulting solid titanium catalyst will have sometimes the composition deviating from the preferred catalyst composition as mentioned previously.

The titanium catalyst component thus obtained is represented by the empirical formula Mg$_r$Al$_s$Ti$_t$(OR$^7$-

)$_u$X$^1_v$ wherein r, s, t, u, v>0, and X$^1$ is halogen, and may optionally contain other compounds such as a silicon compound. In this titanium catalyst component, Ti/Mg (atomic ratio) is usually 0.01–0.5, preferably 0.02–0.2, Al/Mg (atomic ratio) is 0.05–1. preferably 0.08–0.5 and especially 0.12–0.3, X$^1$/Mg (atomic ratio) is 1.5–3, preferably 2–2.5, OR$^7$/Mg (weight ratio) is 0.5–15, preferably 1–10 and especially 2–6, and a specific surface area is 50–1000 m$^2$/g, preferably 150–500 m$^2$/g. Further, 10–100% of the all Ti exhibits a valence lower than Ti$^{4+}$.

The solid titanium catalyst component [A] as illustrated above may be used in combination with an organoaluminum compound catalyst component [B] in the polymerization of olefin.

The organoaluminum compound catalyst component [B] mentioned above may be selected from among the previoiusly exemplified alkylaluminum compounds which can be used in the preparation of the solid titanium catalyst component.

Of the alkylaluminum compounds referred to above, preferred are trialkylaluminum and alkylaluminum halide or mixtures thereof.

Polymerization of olefin with an olefin polymerization catalyst containing the solid component [A] and the component [B] as mentioned above includes not only the copolymerization of ehylene and pentene-1 but also the copolymerization of three or more components such as ethylene, pentene-1 and small amounts of other α-olefins or polyenes. The above-mentioned olefin polymerization catalyst is useful particularly when ethylene and pentene-1 are copolymerized in the vapor phase.

The polymerization reaction is carried out in the vapor phase, and this reaction can be carried out using a fluidized reactor, stirring bed reactor, stirring bed fluid reactor or tube reactor.

The solid titanium catalyst component [A] is used in powder form or after suspending it in a hydrocarbon medium or olefin, and the organoaluminum compound catalyst component [B] is fed to the polymerization system after dilution with a proper diluent or fed, as it is, to said system.

Further, the molecular weight of the resulting polymer can be controlled by feeding hydrogen to the polymerization system.

In the present invention, it is preferably to use a pre-polymerized catalyst. In carrying out the pre-polymerization, the electron donor catalyst component mentioned previously can be used in addition to the catalyst component [A] and the organoaluminum compound [B]. In that case, the amount of the electron donor catalyst component used is 0.01–30 moles, preferably 0.1–10 moles and more preferably 0.5–5 moles based on 1 gram atom of titanium present in the titanium catalyst component [A]. The pre-polymerization is to polymerize α-olefin of 2–10 carbon atoms on the catalyst in an inert hydrocarbon solvent, a liquid monomer as a solvent or in the absence of any solvent, however, the pre-polymerization carried out in the inert hydrocarbon solvent is preferred.

In the pre-polymerization, the amount of α-olefin polymerized is 0.5–5000 g, preferably 1–1000 g and more preferably 3–200 g based on 1 g of the titanium catalyst component used.

The inert hydrocarbon solvent used in the pre-polymerization includes aliphatic hydrocarbons such as propane, butane, n-pentane, iso-pentane, n-hexane, iso-hexane, n-heptane, n-octane, isooctane, n-decane, n-dodecane and kerosine; alicyclic hydrocarbons such as cyclopentane, methylcyclopentane, cyclohexane and methylcyclohexane; aromatic hydrocarbons such as benzene, toluene and xylene; and halogenated hydrocarbons such as methylene chloride, ethyl chloride, ethylene chloride and chlorobenzene. Of these hydrocarbons as exemplified above, preferred are aliphatic hydrocarbons, particularyly those of 3–10 carbon atoms.

When the inert solvent or the liquid monomer as an inert solvent is used in the pre-polymerization, the titanium catalyst component [A] is used in an amount, per 1 liter of the solvent, of 0.001–500 mmoles, preferably 0.005–200 mmoles in terms of titanium atom, and the organoaluminum compound [B] is used in such a proportion that Al/Ti (atomic ratio) is 0.5–500, preferably 1.0–50 and especially 2.0–20.

The α-olefin used in the pre-polymerization includes those having not more than 10 carbon atoms such as ethylene, propylene, 1-butene, 1-pentene, 4-methyl-1-pentene, 3-methyl-1-pentene, 1-heptene, 1-octene and 1-decene, and of these α-olefins, ethylene is particularly preferred. In carrying out the pre-polymerization, these α-olefins may be homopolymerized independently, or two or more α-olefins may be copolymerized, so long as the resulting pre-polymerized catalyst is intended to prepare crystalline polymers.

The polymerization temperature empolyed in the pre-polymerization varies according to the kind of α-olefin and inert hydrocarbon solvent used and cannot be defined indiscriminately, but the temperature is commonly from −40° to 80° C., preferably from −20° to 40° C. and especially from −10° to 30° C.

In the pre-polymerization, hydrogen may be allowed to coexist in the polymerization system.

Further, the pre-polymerization may be carried out by any of the batchwise and continuous methods, but the continuous method is preferred when the pre-polymerization on a large scale is required.

In the present invention, it is preferable to carry out the copolymerization of ethylene and pentene-1 with the aforementioned catalyst which has been subjected to pre-polymerization. The pre-polymerized catalyst may be fed in powder state to the vapor phase polymerizer, or said catalyst suspended in a hydrocarbon solvent as aforesaid may be fed to the polymerizer. The pre-polymerized catalyst is desirably suspended particularly in a low boiling solvent such as propane, iso-butane, n-butane or iso-pentane. By carrying out copolymerization of ethylene and pentene-1 with the olefin polymerization catalyst containing the above-mentioned pre-polymerized titanium catalyst component [A], an ethylene/pentene-1 copolymer is prepared in an amount, based on 1 g of said titanium catalyst component, of 1,000–100,000 g, preferably 2,000–50,000 g and especially 3,000–30,000 g.

In the olefin polymerization catalyst, the organoaluminum compound catalyst component [B] is used in an amount, based on 1 gram atom of titanium present in the titanium catalyst component [A], of 1–1000 moles, preferably 3–500 moles and especially 5–100 moles. Further, the olefin polymerization catalyst may also contain other compound, for example, the electron donor catalyst component. In that case, the electron donor catalyst component is used in an amount, based on 1 gram atom of the metal element present in the organoaluminum compound catalyst component [B], of not more than 100 moles, preferably not more than 1 mole and especially 0.001–0.1 mole.

The copolymerization of ethylene and pentene-1 is carried out at the polymerization temperature of 20°-130° C., preferably 50°-120° C. and especially 70°-110° C. The polymerization pressure empolyed at that time is 1-50 kg/cm², preferably 2-30 kg/cm² and especially 5-20 kg/cm². Further, an inert gas forming a gaseous state in the polymerization system, such as methane, ethane, propane, butane or nitrogen, may suitably fed to the polymerization system.

In carrying out the polymerization reaction, the solid titanium catalyst component [A] is used in an amount, based on 1 liter of the reaction volume, of from 0.00001 to about 1 mmol, preferably from about 0.0001 to about 0.1 mmole in terms of Ti atom.

The ethylene/pentene 1 copolymers [III] are now illustrated in detail hereinafter.

The ethylene/pentene-1 copolymers [III] are random copolymers obtained by copolymerization of ethylene and pentene-1 in the presence of the specific catalysts. The ethylene/pentene-1 copolymers [III] may also be further copolymerized, in the same manner as in the case of the ethylene/pentene-1 copolymers [I], with small amounts of other α-olefins or polyenes.

The ethylene/pentene-1 copolymers [III] have a melt flow rate (MFR), as measured according to ASTM D 1238E, of 0.01 to 100 g/10 min, preferably 0.05 to 50 g/10 min. If this MFR is less than 0.01 g/10 min, the resulting copolymer tends to deteriorate in moledablity, and molded articles, such as a film, obtained from said copolymer tend to be lower in transparency. If this MFR exceeds 100 g/10 min, the resulting copolymer tends to deteriorate in mechanical strength.

The ethylene/pentene-1 copolymers [III] have a density of 0.87 to 0.94 g/cm³, preferably 0.88 to 0.93 g/cm³ as measured according to ASTM D 1505.

The ethylene/pentene-1 copolymers [III] contain 1 to 25% by weight, preferably 4 to 23% by weight, and especially 6 to 20% by weight of a structural unit derived from pentene-1 and 75 to 99% by weight, preferably 77 to 96% by weight, and especially 80 to 94% by weight of a structural unit derived from ethylene.

The ethylene/pentene-1 copolymers [III] may contain not more than 10% by weight, preferably not more than 5% by weight, especially not more than 3% by weight of a structural unit derived from other α-olefins or polyenes in addition to ethylene and pentene-1 as mentioned above.

Further, the relationship between the ratio of Hh/Hl as measured from the DSC melt-peak pattern of "ultra-slowly cooled sample" of the ethylene/pentene-1 copolymer [III] and the density of the copolymer satisfies the following formula.

$$0 < Hh/Hl < 60d - 52.0 \quad [10],$$

preferably, $$0 < Hh/Hl < 40d - 34.5 \quad [10']$$

and especially $$0 < Hh/Hl < 1 \quad [10'']$$

wherein Hh represents a peak height on the higher temperature side, Hl represents a peak height on the lower temperature side, and d represents the density of the copolymer.

The ratio (RS) of the impact strength of a film of 40 μm in thickness to the tear strength thereof in the take-off direction satisfies the following formula [11], said film being obtained by casting the ethylene/pentene-1 copolymer [III] having the above-mentioned characteristics.

$$RS \geq -20 \log MFR - 1000d + 968 \quad [11]$$

wherein MFR represents the melt flow rate of the copolymer, and d represents the density of the copolymer, preferably $$RS \geq -20 \log MFR - 1000d + 973 \quad [11']$$

and especially $$200 \geq RS \geq -20 \log MFR - 1000d + 975 \quad [11''].$$

When the ratio (RS) of the impact strength to the tear strength is less than $(-20 \log MFR - 1000d + 968)$, the resulting film has poor tear properties, though it has a high impact strength, or the resulting film is inferior in impact strength, though it has good tear properties. The film of 40 μm in thickness, used for the measurement of the RS value, is a film prepared by molding the ethylene/pentene-1 copolymer under the following conditions into a film by using a T-die film molding machine equipped with a 65 mmφ extruder.

Molding conditions:
Resin temperature: 220° to 240° C.
Chill roll temperature: 30° to 40° C.
Film-forming rate: 20 to 30 m/min
Draft ratio (film thickness/lip opening): 0.05 to 0.07

The cast film of 40 μm in thickness, obtained by processing the copolymer [III] in the manner mentioned above has an impact strength of generally not lower than 1000 kg·cm/cm, preferably not lower than 1200 kg·cm/cm.

It is desirable that the tear strength ($T_{MD}$) of said film in the take-off direction and the melt flow rate (MFR) of the ethylene/pentene-1 copolymer [III] fulfills the relationship represented by the following formula [12].

$$\log T_{MD} \leq -0.37 \log MFR - 5.1d + 6.72 \quad [12]$$

wherein d is the density of the copolymer, preferably $$\log T_{MD} \leq -0.37 \log MFR - 5.1d + 6.65 \quad [12'],$$

and especially $$\log T_{MD} \leq -0.37 \log MFR - 5.1d + 6.59 \quad [12''],$$

Films excellent in impact strength as well as tear properties can be obtained from the ethylene/pentene-1 copolymers [III] which fulfills the relationship represented by the above formula [12] with respect to the tear strength ($T_{MD}$) of the film in the take-off direction and MFR.

Pressed sheets of 2 mm in thickness obtained by molding the ethylene/pentene-1 copolymers [III] as mentioned above according to ASTM D 1928 have stress cracking resistance [SC resistance (ESCR), measured according to ASTM D 1692, antalocks 100%, 50° C.] of at least 10 hr and satisfy the relationship represented by the following formula [13-a].

$$ESCR \geq 0.7 \times 10^4 (\log 80 - \log MFR)^3 (0.952-d) \quad [13-a]$$

wherein $2.0 \leq MFR \leq 50$ and d is the density of the copolymer, preferably $$ESCR \geq 0.9 \times 10^4 \,(\log 80 - \log MFR)^3 \,(0.952-d) \quad [13'-a]$$

and especially $$ESCR \geq 1.1 \times 10^4 \,(\log 80 - \log MFR)^3 \,(0.952-d) \quad [13''-a]$$

Further, pressed sheets of 2 mm in thickness, obtained by molding the ethylene/pentene-1 copolymers [III] according to ASTM D 1928 have stress cracking resistance [SC resistance (ESCR), measured according to ASTM D 1692, antalocks 10%, 50° C.] of at least 20 hr and satisfy the relationship represented by the following formula [13-b].

$$ESCR \geq 1.4 \times 10^4 \,(\log 40 - \log MFR)^2 \,(0.952-d) \quad [13\text{-}b]$$

wherein $1.0 \leq MFR \leq 20$ and d is the density of the copolymer, preferably $$ESCR \geq 1.7 \times 10^4 \,(\log 40 - \log MFR)^2 \,(0.952-d) \quad [13'\text{-}b]$$

and especially $$ESCR \geq 2.0 \times 10^4 \,(\log 40 - \log MFR)^2 \,(0.952-d) \quad [13''\text{-}b]$$

Furthermore, pressed sheets of 2 mm in thickness, obtained by molding the ethylene/pentene-1 copolymers [III] according to ASTM D 1928 have stress cracking resistance [SC resistance (ESCR), measured according to ASTM D 1692, antalocks 10%, 60° C.] of at least 50 hr and satisfy the relationship represented by the following formula [13-c].

$$ESCR \geq 0.50 \times 10^4 \,(\log 100 - \log MFR) \,(0.952-d) \quad [13\text{-}c]$$

wherein $0.1 \leq MFR \leq 5$ and d is the density of the copolymer, preferably $$ESCR \geq 0.65 \times 10^4 \,(\log 100 - \log MFR) \,(0.952-d) \quad [13'\text{-}c]$$

and especially $$ESCR \geq 0.80 \times 10^4 \,(\log 100 - \log MFR) \,(0.952-d) \quad [13''\text{-}c]$$

Moreover, it is preferred that the haze of the above-mentioned pressed sheets and the melt flow rate (MFR) of the ethylene/pentene-1 copolymers [III] satisfy the relationship represented by the following formula [14].

$$\log HAZE \leq 15d - 0.45 \log MFR - 12.23 \quad [14]$$

wherein d is the density of the copolymer.

$$\log HAZE \leq 15d - 0.45 \log MFR - 12.26 \quad [14']$$

and especially $$\log HAZE \leq 15d - 0.45 \log MFR - 12.30 \quad [14'']$$

The press sheets of 0.1 mm in thickness, used for the measurements of the above-mentioned physical properties were prepared from the ethylene/pentene-1 copolymers according to ASTM D 1928.

The measurement of HAZE was conducted according to ASTM D 1003.

Now, the process for preparing the ethylene/pentene-1 copolymers [III] is illustrated below in detail.

The ethylene/pentene-1 copolymers [III] may be prepared, for example, by copolymerizing ethylene and pentene-1 in the presence of such catalysts as will be mentioned below. Copolymerizing ethylene and pentene-1 in the presence of an olefin polymerization catalyst described hereinafter under specific conditions.

Examples of the olefin polymerization catalyst which are used in the process for preparing the ethylene/pentene-1 copolymers [III] include olefin polymerization catalysts formed from

[A] a titanium catalyst component in a liquid form comprising a halogen-containing magnesium compound, oleyl alcohol and a titanium compound, and

[B] a halogenated organoaluminum compound.

Examples of the halogen-containing magnesium compound include magnesium chloride, magnesium bromide, magnesium iodide and magnesium fluoride. Of these compounds, magnesium chloride is particularly preferable.

The titanium compound includes tetravalent titanium compounds represented by the formula $Ti(OR)_g X_{4-g}$ (wherein R is a hydrocarbon group, X is halogen and g is a number of 0 to 4).

Concrete examples of these titanium compounds include titanium tetrahalides such as $TiCl_4$, $TiBr_4$ and $TiI_4$; alkoxytitanium trihalides such as $Ti(OCH_3)Cl_3$,
$Ti(OC_2H_5)Cl_3$,
$Ti(O-iC_3H_7)Cl_3$,
$Ti(O-nC_4H_9)Cl_3$,
$Ti(OC_2H_5)Br_3$,
$Ti(O-iC_3H_7)Br_3$, and
$Ti(O-iC_4H_9)Br_3$;

alkoxytitanium dihalides such as $Ti(OCH_3)_2Cl_2$,
$Ti(OC_2H_5)_2Cl_2$,
$Ti(O-iC_3H_7)_2Cl_2$,
$Ti(O-nC_4H_9)_2Cl_2$, and
$Ti(OC_2H_5)_2Br_2$;

trialkoxytitanium monohalides such as $Ti(OCH_3)_3Cl$,
$Ti(OC_2H_5)_3Cl$,
$Ti(O-iC_3H_7)_3Cl$,
$Ti(O-nC_4H_9)_3Cl$, and
$Ti(OC_2H_5)_3Br$, and tetraalkoxytitanium compounds such as $Ti(OCH_3)_4$,
$Ti(OC_2H_5)_4$,
$Ti(O-nC_3H_7)_4$,
$Ti(O-iC_3H_7)_4$,
$Ti(O-nC_4H_9)_4$,
$Ti(OC_6H_{13})_4$, $Ti(OC_6H_{11})_4$,
$Ti(OC_8H_{17})_4$,
$Ti[OCH_2(C_2H_5)CHC_4H_9]_4$,
$Ti(OC_9H_{19})_4$,
$Ti[OC_6H_3(CH_3)_2]_4$,
$Ti(OC_{18}H_{35})_4$,
$Ti(OCH_3)_2(OC_4H_9)_2$,
$Ti(OC_3H_7)_3(OC_4H_9)$,
$Ti(OC_2H_5)_2(OC_4H_9)_2$,
$Ti(OC_2H_5)_2(O-iC_3H_7)_2$,
$Ti(OC_2H_5)(OC_{18}H_{35})_3$,
$Ti(OC_2H_5)_2(OC_{18}H_{35})_2$, and Ti(OC$_2$H$_5$)$_3$(OC$_{18}$H$_{35}$).

Of these compound, the compounds where $1 \leq g \leq 4$ are preferable, and the compounds where $2 \leq g \leq 4$ are more preferable. Particularly preferred are tetraalkoxytitanium compounds.

The titanium catalyst component [A] in a liquid form which is a member for forming the olefin polymerization catalyst used in the process for preparing the ethylene/pentene-1 copolymers [III] is a substantially uniform solution which comprises the above-described halogen-containing magnesium compound, oleyl alcohol and the above-described titanium compound.

It is preferred that the titanium catalyst component [A] in a liquid form is prepared, for example, by preparing a mixture of a halogen-containing magnesium compound and oleyl alcohol and then bringing the mixture into contact with a titanium compound. The mixture of a halogen-containing magnesium compound and oleyl alcohol may be in the form of a solution or a suspension, but a solution form is preferable. In another preferred embodiment, the titanium catalyst component is prepared by changing to a solution state while mixing the above-mentioned three ingredients.

In the preparation of the titanium catalyst component [A] in a liquid form, the mixture of a halogen-containing magnesium compound and oleyl alcohol is preferably brought into contact with the titanium compound at a temperature of not lower than 40° C., preferably 40° to 200° C., more preferably 50° to 150° C. for at least one minute, preferably 15 minutes to 24 hours, particularly preferably 30 minutes to 15 hours to react them.

Further, the titanium catalyst component [A] in a liquid form can be prepared by bringing a halogen-containing magnesium compound, oleyl alcohol and a titanium compound simultaneously into contact with one another at a temperature of not lower than 40° C., preferably 40° to 200° C., more preferably 50° to 150° C. for at least one minute, preferably 15 minutes to 24 hours, particularly preferably 30 minutes to 15 hours to react them.

In the preparation of the titanium catalyst component in a liquid form, which comprises the halogen-containing magnesium compound, oleyl alcohol and the titanium compound, hydrocarbon solvents can also be used.

Namely, the magnesium halide and oleyl alcohol are dissolved in a hydrocarbon solvent and may be brought into contact with the titanium compound. Alternatively, the halogen-containing magnesium compound, oleyl alcohol and the titanium compound are dissolved in a hydrocarbon solvent to thereby bring them into contact with one another.

Examples of such hydrocarbon solvents include aliphatic hydrocarbons such as pentane, hexane, heptane, octane, decane, dodecane, tetradecane and kerosine; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichlorobutane, trichloroethylene, carbon tetrachloride and chlorobenzene.

Preferably, the halogen-containing magnesium compound, the titanium compound and oleyl alcohol are used in the following amounts.

The ratio by mol of oleyl alcohol/MgCl$_2$ is usually 2 to 4, preferably 2 to 3.

The ratio by mol of the titanium compound/MgCl$_2$ is usually 0.04 to 0.30, preferably 0.05 to 0.20.

The ratio by mol of oleyl alcohol/the titanium compound is 5 to 100, preferably 10 to 80.

The halogen-containing organoaluminum compound [B] used in the preparation of the ethylene/pentene-1 copolymers [III] includes dialkylaluminum halides such as diethylaluminum chloride, dibutylaluminum chloride, diethylaluminum bromide;

alkylaluminum sesquihalides such as ethylaluminum sesquichloride, butylaluminum sesquichloride and ethylaluminum sesquibromide;

partially halogenated alkylaluminum compounds such as ethylaluminum dichloride, propylaluminum dichloride and butylaluminum dibromide; and partially alkoxylated and halogenated alkylaluminum compounds such as ethylaluminum ethoxychloride, butylaluminum butoxychloride and ethylaluminum ethoxybromide.

In addition to these halogen-containing organoaluminum compounds, organoaluminum compounds containing no halogen can be used.

Examples of the organoaluminum compounds containing no halogen which can be used in the present invention include trialkylaluminum compounds such as triethylaluminum and tributylaluminum;

trialkenylaluminum compounds such as isoprenylaluminum and triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds having an average composition represented by the formula R$^1_{2.5}$Al(OR$^2$)$_{0.5}$;

dialkylaluminum hydrides such as diethylaluminum hydride and dibutylaluminum hydride; and partially hydrogenated alkylaluminum compounds such as alkylaluminum dihydrides, for example, ethylaluminum dihydride and propylaluminum dihydride.

Further, organoaluminum compounds similar to the above-mentioned compounds include organoaluminum compounds in which two or more aluminum atoms are bonded to each other through oxygen atom or nitrogen atom. Concrete examples of such organoaluminum compounds include, for example,

(C$_2$H$_5$)$_2$AlOAl(C$_2$H$_5$)$_2$,

(C$_4$H$_9$)$_2$AlOAl(C$_4$H$_9$)$_2$,

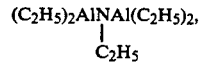

$$\begin{array}{c}(C_2H_5)_2AlNAl(C_2H_5)_2,\\|\\C_2H_5\end{array}$$

and methylaluminoxane.

Other examples of the organoaluminum compounds containing no halogen include complex compounds of aluminum with Group I metals of the Periodic Table. Concrete examples of such organoaluminum compounds include

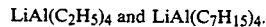

LiAl(C$_2$H$_5$)$_4$ and LiAl(C$_7$H$_{15}$)$_4$.

Among the above-described compounds, particularly preferred are trialkylaluminum compounds or alkylaluminum compounds in which two or more aluminum compounds are bonded to each other. These organoaluminum compounds containing no halogen can be used in an amount of not more than 70 mol %, preferably not more than 40 mol %, and especially not more than 10 mol % in combination with the halogen-containing organoaluminum compounds.

The ethylene/pentene-1 copolymers [III] are obtained by carrying out polymerization reaction of ethylene with pentene-1 in a hydrocarbon solvent using the above-mentioned catalyst components. Examples of the hydrocarbon solvent include aliphatic hydrocarbons such as pentane, hexane, heptane, octane, decane, dodecane and kerosine and halogenated derivatives thereof; alicyclic hydrocarbons such as cyclohexane, methylcyclopentane and methylcyclohexane and halogenated derivatives thereof; and aromatic hydrocarbons such as benzene, toluene and xylene and halogenated derivatives thereof such as chlorobenzene. Olefin itself which is used in the copolymerization reaction as a copolymerizable monomer can be used as a solvent.

In carrying out the copolymerization reaction, titanium atom is used in an amount of about 0.0005 to about 1 mmol, more preferably about 0.001 to about 0.5 mmol per liter of the reaction volume and the organoaluminum compound is used in such an amount that to give a ratio by atom of aluminum/titanium of about 1 to about 2000, preferably about 5 to about 100. Olefin polymerization temperature is about 20° to about 300° C., preferably about 65° to about 250° C. Polymerization pressure is atmospheric pressure to 3000 kg/cm$^2$-G, preferably about 2 to about 100 kg/cm$^2$-G, and especially about 5 to about 50 kg/cm$^2$-G.

It is preferable that hydrogen is allowed to coexist in the olefin polymerization system to control molecular weight.

The polymerization may be carried out continuously or batchwise. Alternatively, the polymerization may also be carried out by two or more steps under different conditions.

In the ethylene/pentene-1 copolymer compositions of the present invention, there may be used as the ethylene/pentene-1 copolymers (A), for example, the above-mentioned ethylene/pentene-1 copolymers [I], [II] or [III], or mixtures thereof.

(B) HIGH-PRESSURE POLYETHYLENE

The high-pressure polyethylene used in the first ethylene/pentene-1 copolymer composition of the present invention have a melt index (190° C.) of preferably 0.1 to 10 g/10 min, and especially 1.0 to 5.0 g/10 min, and those having a density of preferably 0.915 to 0.935 g/cm$^3$ and especially 0.920 to 0.925 g/cm$^3$ have an excellent effect of improving transparency.

By high-pressure polyethylenes as referred to in the invention are meant not only homopolymer of ethylene but also copolymers of ethylene with other polymeric monomers, for example, vinyl acetate, acrylic ester, etc. used in such a small amount that will not hinder the invention from accomplishing its object.

(C) POLYETHYLENE

The polyethylene used for the second ethylene/pentene-1 copolymer composition of the invention has a density of greater than 0.935 g/cm$^3$. In the present invention, a polyethylene having a density of 0.940 to 0.975 g/cm$^3$ is preferably used, and a high density polyethylene having a density of 0.945 to 0.970 g/cm$^3$ is particularly preferably used. The density is determined according to ASTM D 1505.

Furthermore, there is used as the polyethylene (C) a polyethylene having a melt flow rate (MFR) of usually 0.1 to 35 g/10 min, preferably 0.5 to 30 g/10 min as determined by ASTM D 1238 E.

The ratio of the MFR of the copolymer (A) to that of the polyethylene (C) is usually 0.1 to 30, preferably 0.2 to 25, particularly preferably 0.2 to 20.

Such a polyethylene (C) has a relatively high crystallinity index. The polyethylene (C) used in the present invention has a crystallinity index of usually not less than 50%, preferably not less than 55%, and, for example, when a high-density polyethylene prepared by Ziegler process is used, the polyethylene preferably has a crystallinity index of 55 to 85%.

The polyethylene (C) as described above can be prepared by various procedures.

For example, ethylene is polymerized at a pressure of a normal pressure to about 10 kg/cm$^{-2}$ in the presence of a catalyst mainly containing such an organometallic compound as illustrated in the preparation of the above-mentioned ethylene/pentene-1 copolymer to give the polyethylene (C). Moreover, in the polymerization as described above, another polymeric monomer such as another olefin including propylene-1 and butene-1, vinyl acetate and acrylic acid ester may be used with ethylene in such a small amount that will not hinder the invention from accomplishing its object, for example, in an amount of not more than 10% by weight. Although the so-called high density polyethylene is usually used as the polyethylene (C) in the composition of the invention, there may also be used in the present invention a polyethylene prepared, for example, by blending a high density polyethylene and a low or medium density polyethylene in such a manner that the density of the resultant polyethylene lies in the range of that of the polyethylene (C).

(D) α-OLEFIN RANDOM COPOLYMER

The α-olefin random copolymer (D) used in the third ethylene/pentene-1 copolymer composition of the invention is a copolymer other than ethylene/pentene-1 copolymer, prepared by copolymerizing at least two α-olefins, and structural units derived from the different types of α-olefins mutually randomly arranged within the molecule.

The α-olefin random copolymer (D) different from the ethylene/pentene-1 copolymer (A) described above is low crystalline or amorphous, and has a crystallinity index of not greater than 30%, preferably not greater than 25%, as determined by X-ray diffractometry. Accordingly, many of the α-olefin random copolymers (D) do not show a definite melting point. Moreover, the α-olefin random copolymer (D) is soft compared with the above-mentioned ethylene/pentene-1 copolymer (A) due to the low crystallinity index. The tensile modulus of the copolymer (D) is usually 0.1 to 1000 kg/cm$^2$, preferably 1 to 800 kg/cm$^2$. The ethylene/pentene-1 copolymer (A) described above has a tensile modulus of usually 100–15000 kg/cm$^2$, preferably about 300–13000 kg/cm$^2$, and is a resin which is hard compared with the α-olefin random copolymer (D).

Furthermore, the α-olefin random copolymer (D) has a melt flow index (as determined at 190° C.) of usually 0.1–30 g/10 min, preferably 1.0–20 g/10 min and particularly preferably 2.0–15 g/10 min. It also has a Mw/Mn value as measured by GPC of usually not greater than 5.5, preferably not greater than 4.5 and particularly preferably not greater than 3.5.

Such an α-olefin random copolymer (D) has a glass transition temperature (Tg) of usually −150° to +50° C., preferably −80° to −20° C., an intrinsic viscosity [η], as measured in decalin at 135° C., of 0.2–10 dl/g, preferably 1–5 dl/g. Further, the copolymer (D) has a density of usually 0.82–0.96 g/cm$^3$, preferably 0.84–0.92 g/cm$^3$.

Such an α-olefin random copolymer (D) is further illustrated in detail below with reference, as typical examples, to (D1) an ethylene/α-olefin copolymer rubber, and
(D2) a propylene/α-olefin copolymer rubber.

The constituent α-olefins used in the preparation of the above-mentioned ethylene/α-olefin copolymer rubber (D1) may usually include those having 3–20 carbon atoms, for example, propylene, butene-1, hexene-1, 4-methylpentene-1, octene-1, decene-1 and mixtures thereof. Of these α-olefins exemplified above, particularly preferred are propylene and/or butene-1.

The constituent α-olefins used in the preparation of the above-mentioned propylene/α-olefin copolymer rubber (D2) may include usually those having 4–20 carbon atoms, for example, butene-1, pentene-1, hexene-1, 4-methylpentene-1, octene-1, decene-1 and mixtures thereof. Of these α-olefins exemplified above, particularly preferred is butene-1.

The α-olefin copolymers used in the preparation of the compositions in the invention may contain such component units other than those derived from α-olefins as derived from diene compounds, so long as no characteristics of the α-olefin copolymers are impaired, For example, the above-mentioned other component units permitted to be contained in the α-olefin copolymers used in the invention include;

component units derived from chain non-conjugated dienes such as 1,4-hexadiene, 1,6-octadiene, 2-methyl-1,5-hexadiene, 6-methyl-1,5-heptadiene and 7-methyl-1,6-octadiene;

component units derived from cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene;

component units derived from diene compounds such as 2,3-diisopropylidene-5-norbornene, 2-ethylidene-3-isopropylidene-5-norbornene and 2-propenyl-2,2-norbornadiene; and component units derived from cycloolefin components. The content in the α-olefin random copolymer of the component units as described above is usually not more than 10 mol %, preferably not more than 5 mol %.

In the ethylene/α-olefin copolymer (D1) as described above, the molar ratio (ethylene/α-olefin) of ethylene to α-olefin, though it varies depending upon the kind of α-olefin used, is generally from 1/99 to 99/1, preferably from 50/50 to 95/5. The above-mentioned molar ratio is preferably from 50/50 to 90/10 when the α-olefin is propylene, and is preferably from 80/20 to 95/5 when the α-olefin is has not less than 4 carbon atoms.

In the propylene/α-olefin copolymer (D2) used in the invention, the molar ratio (propylene/α-olefin) of propylene to α-olefin, though it varies depending upon the kind of α-olefin used, is generally preferably from 50/50 to 95/5. The above-mentioned molar ratio is preferably from 50/50 to 90/10 when the α-olefin is 1-butene, and is preferably from 80/20 to 95/5 when the α-olefin has not less than 5 carbon atoms.

Of the α-olefin copolymers used in the invention, preferred are ethylene/propylene random copolymers or ethylene/α-olefin random copolymers having the ethylene component unit content of 35–50 mol % and a crystallinity index of not more than 10%, because they show excellent improvement in mechanical properties such as impact strength of the composition of the invention.

As the α-olefin random copolymer (D) in the invention, there are used usually the above-mentioned ethylene/α-olefin copolymer (D1) and propylene/α-olefin copolymer (D2), either singly or in combination. However, the α-olefin random copolymer (D) may contain polymers, copolymers other than the above-mentioned α-olefin random copolymers (D1), (D2) so long as no characteristics of the α-olefin random copolymers (D) are impaired.

Other polymers or copolymers as referred to above may be aromatic vinylhydrocarbon/conjugated diene copolymers or hydrogenation products thereof. Concretely, such aromatic vinylhydrocarbon/conjugated diene copolymers or hydrogenation products thereof as mentioned above include styrene/butadiene copolymer rubber, styrene/butadiene/styrene copolymer rubber, styrene/isoprene block copolymer rubber, styrene/isoprene/styrene block copolymer rubber, hydrogenated styrene/butadiene/styrene block copolymer rubber and hydrogenated styrene/isoprene/styrene block copolymer rubber.

COMPOSITIONS

The first ethylene/pentene-1 copolymer composition according to the present invention comprises the specific ethylene/pentene-1 copolymer (A) and the high-pressure polyethylene (B), as described above.

The second ethylene/pentene-1 copolymer composition according to the present invention comprises the specific ethylene/pentene-1 copopolymer and the polyethylene (C) having a specific density, as described above.

The third ethylene/pentene-1 copolymer composition according to the present invention comprises the specific ethylene/pentene-1 copolymer (A) and the specific α-olefin random copolymer (D), as described above.

Usually, when two kinds of polymers are mixed together, the resulting composition exhibits only an average performance of or a performance of the two polymers or lower than that. Viewed in this light, it is quite unexpected that ethylene/pentene-1 copolymers have been improved in characteristics, which the composition is required to have when used for the production of films, without sacrifice of the excellent characteristics that the ethylene/pentene-1 copolymer has, by the addition of either one of the above-mentioned components (B) to (D) to the ethylene/pentene-1 copolymer.

Especially, in the first composition of the invention, the properties such as transparency and moldability of the ethylene/pentene-1 copolymer is improved by incorporating the high-pressure polyethylene into the ethylene/pentene-1 copolymer.

In the second composition of the invention, the properties such as impact resistance, transparency and blocking resistance of the ethylene/pentene-1 copolymer is improved by incorporating a polyethylene having a specific density into the ethylene/pentene-1 copolymer.

In the third composition of the invention, the properties such as impact resistance, transparency and heat-sealing properties at low temperature of the ethylene/pentene-1 copolymer is improved by incorporating a specific α-olefin random copolymer into the ethylene/pentene-1 copolymer.

The mixing ratio of the ethylene/pentene-1 copolymer to the high-pressure polyethylene in the first composition of the invention is 99:1 to 60:40 by weight. The incorporation of the high pressure polyethylene (B) into the ethylene/pentene-1 copolymer (A) in the ratio as described above improves the moldability of the resulting composition and the transparency of the molded articles without impairing excellent characteristics that the ethylene/pentene-1 copolymer inherently has. Moreover, the mixing ratio of both substances is preferably 95:5 to 70:30 by weight, particularly preferably 90:10 to 80:20.

In the second composition of the invention, the mixing ratio of the ethylene/pentene-1 copolymer (A) to the polyethylene (C) having a specific density is 99:1 to 60:40 by weight. The mixing of the ethylene/pentene-1 copolymer and the polyethylene (C) in a ratio as described above improves the balance between tear properties and impact resistance, and blocking resistance of the molded articles, especially the films. Furthermore, the mixing ratio is preferably 97:3 to 70:30 by weight, particularly preferably 97:3 to 80:20 by weight.

In the third composition of the invention, the mixing ratio of the ethylene/pentene-1 copolymer (A) to the α-olefin copolymer (D) is 99:1 to 60:40 by weight. The mixing of the ethylene/pentene-1 copolymer (A) and the α-olefin copolymer (D) in a ratio as described above improves the balance between the tear properties and impact resistance of the molded articles, especially films. Furthermore, the mixing of both substances in a ratio of 95:5 to 70:30 by weight is preferable, and the molded articles show an especially good balance between tear properties and impact resistance when the mixing ratio is 90:10 to 80:20 by weight.

The ethylene/pentene-1 copolymer compositions of the invention may contain a rubber component for improving impact strength or such additives as heat stabilizers, weathering stabilizers, antistatic agents, slip agents, anti-blocking agents, anti-forgging agents, lubricants, dyes, pigments, natural oils, synthetic oils and waxes, and these additives may be used in appropriate amounts. Concrete examples of the stabilizers which may be used optionally include, for example, phenolic antioxidants such as tetrakis[methylene-3-(3,5-di-t-butyl-4-hydroxyphenyl)propionate]methane, β-(3,3-di-t-butyl-4-hydroxyphenyl)propionic acid alkyl ester and 2,2'-oxamidobis[ethyl-3-(3,5-di-t-butyl-4-hydroxylphenyl)]propionate; metal salts of aliphatic acid such as zinc stearate, calcium stearate and calcium 12-hydroxystearate; and fatty acid esters of polyhydric alcohol such as glycerin monostearate, glycerin monolaurate, glycerin distearate, pentaerythritol monostearate, petaerythrito; disearate and pentaerythritol tristearate. These stabilizers may be used singly or in combination, for example, tetrakis [methylene-3-(3,5-di-t-butyl-4-hydroxyphenyl)propionate]methane may be used in combination with zinc stearate and glycerin monostearate.

In the present invention, it is preferable to use particularly the phenolic antioxidant in combination with the fatty acid ester of polyhydric alcohol, said fatty acid ester being desirably an ester obtained by estrification of part of the alcoholic hydroxy group of alcohol of three valences or more.

Concrete examples of the fatty acid esters of such polyhydric alcohol as mentioned above include gycerin fatty acid esters such as glycerin monostearate, glycerin monolaurate, glycerin monomyristate, grycerin monopalmitate, grycerin distearate and grycerin dilaurate; and pentaerythritol fatty acid esters such as pentaerythritol monostearate, pentaerythritol monolaurate, pentaerythritol dilaurate, pentaerythritol distearate and pentaerythritol tristearate.

The phenolic antioxidants mentioned above are used in an amount, based on 100 parts by weight of the above-mentioned ethylene/pentene-1 copolymer composition, of less than 10 parts by weight, preferably less than 5 parts by weight and especially less than 2 parts by weight, and the fatty acid esters of polyhydric alcohol are used in an amount, based on 100 parts by weight pf the ethylene/pentene-1 copolymer composition, of less than 10 parts by weight, preferably less than 5 parts by weight.

In the present invention, the ethylene/pentene-1 copolymer compositions may be incorporated with such fillers used in an amount that does not hinder the invention from accomplishing its object as silica, diatomaceous earth, alumina, titanium oxide, pumice dust, pumice balloon, aluminum hydroxide, magnesium hydroxide, basic magnesium carbonate, dolomite, calcium sulfate, potassium titanium, barium sulfate, calcium sulfite, talc, clay, mica, asbestos, glass fiber, glass flake, glass bead, calsium silicate, monmorillonite, bentonite, graphite, aluminum power, molybuenum sulfide, boron fiber, silicon carbide fiber, polyethylene fiber, polypropylene fiber, polyester fiber and polyamide fiber.

The ethylene/pentene-1 copolymer compositions of the present invention may be prepared by known methods, for example, a method wherein the above-mentioned ethylene/pentene-1 copolymer (A), either one of the above-mentioned components (B) to (D), and, if desired, other components to be added as additives are mechanically blended together by means of an extruder kneader or the like, a method wherein the above-mentioned components are dissolved at once in a suitable good solvent, for example, a hydrocarbon solvent such s hexane, heptane, decane, cyclohexane, benzene, toluene or xylene, or the components are dissolved separately in the solvent, the resulting solvent solution are mixed together, and the solvent is removed from the mixture, or a method where involves the above-mentioned two methods in combination.

FILMS

The films of the present invention is formed from the ethylene/pentene-1 copolymer composition as described above.

The films of the invention can be prepared either by a melting method or by a solution method. For example, a calender method, an inflation method or a T-die method may be adopted when the solution method is employed. When the melting method is employed, either a dry process such as an endless belt method and a drum method, or a wet method may be adopted. The films of the invention can be particularly advantageously prepared by adopting the melting method.

The films of the invention may be either in an unstretched state, in a monoaxially stretched state or in a biaxially stretched state.

Though there is no specific restriction to the thickness of the films of the invention, the thickness is usually 10 μm to 3 mm. Accordingly, the expression "film" in the invention signifies not only a film in an ordinary sense but also the so-called sheet.

Such films of the invention may be used singly, and they may also be used as composite films prepared by laminating other resin films or metallic thin films on the films of the invention. The films of the invention may also be given other characteristics by coating the films or the above-mentioned composite films with a thin film-forming material prepared by dispersing a pigment, a dye, a metallic powder, a photosensitive material, a magnetic material, a magnetooptical material, etc. into a binder.

EFFECT OF THE INVENTION

The compositions of the present invention are superior in transparency, tear resistance and impact resistance to high-pressure polyethylene and, on the one hand, the present compositions have good moldability comparable to that of the high-pressure polyethylene and can be molded into molded articles by means of an ordinary molding machine for high-pressure polyethylene. Accordingly, the compositions of the invention are useful for film-forming purpose, particularly for forming packaging film. In addition thereto, the present compositions can also be used for forming blow molded articles such as a liquid carrying container or the like and for forming compositie films by laminating the film obtained from the present composition with other film, making the best use of their characteristics.

EXAMPLE

The present invention is illustrated below with reference to examples, but is should be construed that the invention is in no way limited to those examples.

EXAMPLE 1

Preparation of Ethylene/Pentene-1 Copolymer

Preparation of Titanium Catalyst Component

A mixture containing 476 g of commercially available anhydrous magnesium chloride suspended in a nitrogen atmosphere in 10 liters of n-decane and then 4.0 kg of oleyl alcohol was added to the suspension. The suspension was stirred at 135° C. for 5 hours to obtain a colorless and transparent liquid.

The liquid thus obtained was cooled to 110° C. and 0.45 mole of $Ti(OC_2H_5)_4$ was added thereto, and the resulting mixture was allowed to undergo reaction at 110° C. for 5 hours. The liquid thus obtained was stored at room temperature.

Polymerization

To a continuous polymerizer having a capacity of 200 l were fed continuously dehydrated and purified hexane at a rate of 100 l/h, ethylaluminum sesquichloride at a rate of 19.9 mmol/h and the titanium catalyst component obtained above at a rate of 0.50 mmol/h in terms of Ti atom. Simultaneously, to the polymerizer were fed ethylene at a rate 13 kg/h, pentene-1 at a rate of 5.4 kg/h and hydrogen at a rate of 9.0 l/h, and copolymerization was carried out under such conditions that the polymerization temperature is 170° C., the total pressure is 31 kg/cm²-G, the retention time is 1 hour and the concentration of the resulting copolymer based on the solvent hexane is 105 g/l.

The copolymer obtained had a melt index (190° C.) of 2.2 g/10 min, a density of 0.921 g/cm³ and contained 12% by weight of a structural unit derived from pentene-1. The ratio (RS) of impact strength to tear strength in the take-off direction of the said copolymer was 50 (impact strength=3000 kg.cm/cm. tear strength in the take-off direction=60 kg/cm). The Hh/Hl ratio obtained from the DSC melt-peak pattern of the said copolymer was 0.65.

Preparation of Composition

The above-mentioned copolymer in which the stabilizer had been incorporated was pelletized by melt extrusion. A mixture of 95 parts by weight of the pellets thus obtained and 5 parts by weight of pellets of a high-pressure polyethylene (melt index 3.2, density 0.921 g/cm³) was mixed together by means of a V-blender.

Molding of Film

Using a commercially available tubular film forming machine, the copolymer obtained above was molded into a film of 180 mm in width and 0.03 mm in thickness. The molding was carried out under such conditions that the resin temperature at the time of molding is 180° C., the revolution of a screw of the extruder is 60 r.p.m., a diameter of the die is 100 mmφ, the width of the die slit is 0.5 mm and the one-stage cool-airing operation is conducted.

Evaluation of Film

The molded film was evaluated to determine its tensile characteristics according to ASTM D 882, its impact strength according to ASTM D 3420, its tear strength according to ASTM D 1004 and its transparency according to ASTM D 1003.

Results obtained are shown in Table 1.

EXAMPLE 2

Example 1 was repeated except that the composition to be prepared was designed to contain 90 parts by weight of the ethylene/pentene-1 copolymer and 10 parts by weight of the high-pressure polyethylene.

Results obtained are shown in Table 1.

EXAMPLE 3

Example 1 was repeated except that the composition to be prepared was designed to contain 80 parts by weight of the ethylene/pentene-1 copolymer and 20 parts by weight of the high-pressure polyethylene.

Results obtained are shown in Table 1.

EXAMPLE 4

Example 1 was repeated except that the composition to be prepared was designed to contain 70 parts by weight of the ethylene/pentene-1 copolymer and 30 parts by weight of the high-pressure polyethylene.

Results obtained are shown in Table 1.

EXAMPLE 5

Example 1 was repeated except that an ethylene/pentene-1 copolymer obtained by varying the feeding rate of ethylene, n-pentene-1 and hydrogen was used, said ethylene/pentene-1 copolymer having a melt flow rate (190° C.) of 1.6 g/10 min, a density of 0.927 g/cm³, the structural unit derived from pentene-1 of 9.2% by weight, RS of 41.7 (impact strength=2000 kg.cm/cm, tear strength in the take-off direction=48 kg/cm) and the Hh/Hl ratio of 0.67.

Results obtained are shown in Table 1.

EXAMPLE 6

Example 1 was repeated except that an ethylene/pentene-1 copolymer obtained by varying the feeding rate of ethylene, n-pentene-1 and hydrogen was used, said ethylene/pentene-1 copolymer having a melt flow rate (190° C.) of 2.2 g/10 min, a density of 0.935 g/cm$^3$, a structural unit derived from pentene-1 of 4.1% by weight, RS of 34 (impact strength=1700 kg.cm/cm, tear strength in the take-off direction=50 kg/cm) and the Hh/Hl ratio of 0.73.

Results obtained are shown in Table 1.

COMPARATIVE EXAMPLE 1

Example 1 was repeated except that a film was formed from only the ethylene/pentene-1 copolymer prepared by the procedure as described in Example 1.

Rusults obtained are shown in Table 1.

COMPARATIVE EXAMPLE 2

Example 1 was repeated except that a film was formed from only the ethylene/pentene-1 copolymer prepared by the procedure as described in Example 5.

Rusults obtained are shown in Table 1.

COMPARATIVE EXAMPLE 3

Example 1 was repeated except that a film was formed from only the ethylene/pentene-1 copolymer prepared by the procedure as described in Example 6.

Rusults obtained are shown in Table 1.

COMPARATIVE EXAMPLE 4

Example 1 was repeated except that the composition to be prepared was designed to contain 50 parts by weight of the ethylene/pentene-1 copolymer and 50 parts by weight of the high-pressure polyethylene.

Rusults obtained are shown in Table 1.

COMPARATIVE EXAMPLE 5

Example 1 was repeated except that a film was formed from only the high-pressure polyethylene used in Example 1.

Rusults obtained are shown in Table 1.

COMPARATIVE EXAMPLE 6

Example 1 was repeated except that in place of the ethylene/pentene-1 copolymer, there was used Ultzex 2020L, a product of Mitsui Petrochemical Ind., Ltd.(see Notes below).

Rusults obtained are shown in Table 1.

Notes) Ultzex 2020L (ethylene 4-methy-pentene-1 copolymer)
Melt flow rate (190° C.)    2.1 g/10 min
Density    0.920 g/cm$^3$
RS    34.2
(impact strength = 3400 kg · cm/cm,
tear strength = 105 kg/cm)
Hh/Hl    1.4

COMPARATIVE EXAMPLE 7

Example 1 was repeated except that in place of the ethylene/pentene-1 copolymer, there was used Moatek 0234M, a product of Idemitsu Petrochemical Ind., Ltd. (see Notes below).

Rusults obtained are shown in Table 1.

Notes) Moatek 0234M (ethylene/butene-1 copolymer)
Melt flow rate (190° C.)    2.25 g/10 min
Density    0.923 g/cm$^3$
RS    19.0
(impact strength = 800 kg · cm/cm,
tear strength = 42 kg/cm)
Hh/Hl    1.8

COMPARATIVE EXAMPLE 8

Example 1 was repeated except that in place of the ethylene/pentene-1 copolymer, there was used Moatek 0238N, a product of Idemitsu Petrochemical Ind., Ltd. (see Notes below).

Rusults obtained are shown in Table 1.

Notes) Moatek 0238N (ethylene/octene-1 copolymer)
Melt flow rate (190° C.)    2.0 g/10 min
Density    0.923 g/cm$^3$
RS    33
(impact strength = 3300 kg · cm/cm,
tear strength = 110 kg/cm)
Hh/Hl    1.5

COMPARATIVE EXAMPLE 9

Example 1 was repeated except that in place of the ethylene/pentene-1 copolymer, there was used LLDPE FG 326, a product of Nihon Yunika K.K. (see Notes below).

Rusults obtained are shown in Table 1.

Notes) FG 326 (ethylene/hexene-1 copolymer)
Melt flow rate (190° C.)    0.86 g/10 min
Density    0.923 g/cm$^3$
RS    21
(impact strength = 2900 kg · cm/cm,
tear strength = 140 kg/cm)
Only one melt-peak at 124° C. is observed.

COMPARATIVE EXAMPLE 10

Example 2 was repeated except that in place of the ethylene/pentene-1 copolymer prepared in Example 1, there was used an ethylene/butene-1 copolymer prepared under the conditions mentioned below.

Rusults obtained are shown in Table 1.

Preparation of Titanium Catalyst Component

The same procedure as described in Example 1 was repeated, except that the amount of Ti(OC$_2$H$_5$)$_4$ used was changed to 0.54 mole.

Polymerization

The same procedure as described in Example 1 was repeated except that the titanium catalyst component obtained above was fed at a rate of 0.50 mmol/h, in terms of Ti atom, the amount of ethylaluminum sesquichloride used was changed to 21.5 mmol/h, butene-1 was fed at a rate of 3.4 kg/h in place of the pentene-1, and hydrogen was fed at a rate of 7.3 l/h.

The copolymer obtained has a melt flow rate (190° C.) of 2.0 g/10 min, a density of 0.921 g/cm$^3$, RS of 20.5

(impact strength=900 kg.cm/cm, tear strength=44 kg/cm), and Hh/Hl of 1.9.

COMPARATIVE EXAMPLE 11

Example 1 was repeated except that in place of the ethylene/pentene-1 copolymer, there was used an ethylene/hexene-1 copolymer polymerized under the conditions mentioned below.

Rusults obtained are shown in Table 1.

Preparation of Titanium Catalyst Component

The same procedure as described in Example 1 was repeated, except that the amount of $Ti(OC_2H_5)_4$ used was changed to 0.43 mole.

Polymerization

The same procedure as described in Example 1 was repeated except the titanium catalyst component obtained above was fed at a rate of 0.5 mmol/h, in terms of Ti atom, that the amount of ethylaluminum sesquichloride fed was changed to 17.2 mmol/h, hexene-1 was fed at a rate of 6.7 kg/h in place of the pentene-1, and hydrogen was fed at a rate of 11.3 l/h.

The copolymer obtained has a melt flow rate (190° C.) of 2.0 g/10 min, a density of 0.920 g/cm³, RS of 33 (impact strength=3300 kg.cm/cm, tear strength=110 kg/cm), and Hh/Hl of 0.82.

COMPARATIVE EXAMPLE 12

Example 1 was repeated except that a film was formed from only the ethylene/pentene-1 copolymer prepared by procedure as described in Comparative Example 10.

Rusults obtained are shown in Table 1.

COMPARATIVE EXAMPLE 13

Example 1 was repeated except that a film was formed from only the ethylene/hexene-1 copolymer prepared by procedure as described in Comparative Example 11.

Rusults obtained are shown in Table 1.

EXAMPLE 7

Preparation of Ethylene/Pentene-1 Copolymer

Preparation of Titanium Catalyst Component

The same procedure as described in Example 1 was repeated.

Polymerization

To a continuous polymerizer having a capacity of 200 l were fed continuously dehydrated and purified hexane at a rate of 100 l/h, ethylaluminum sesquichloride at a rate of 19.9 mmol/h and the titanium catalyst component obtained above at a rate of 0.50 mmol/h in terms of Ti atom. Simultaneously, to the polymerizer were fed ethylene at a rate 13 kg/h, pentene-1 at a rate of 5.4 kg/h and hydrogen at a rate of 9.0 l/h, and copolymerization was carried out under such conditions that the polymerization temperature is 170° C., the total pressure is 31 kg/cm²-G, the retention time is 1 hour and the concentration of the resulting copolymer based on the solvent hexane is 105 g/l.

The copolymer obtained had a melt index (190° C.) of 2.2 g/10 min, a density of 0.921 g/cm³ and contained 12% by weight of a structural unit derived from pentene-1. The ratio (RS) of impact strength to tear strength in the take-off direction of the said copolymer was 50 (impact strength=3000 kg.cm/cm. tear strength in the take-off direction=60 kg/cm). The Hh/Hl ratio obtained from the DSC melt-peak pattern of the said copolymer was 0.68.

Preparation of Composition

The above-mentioned copolymer in which the stabilizer had been incorporated was pelletized by melt extrusion. A mixture of 97 parts by weight of the pellets thus obtained and 3 parts by weight of polyethylene having a density of 0.955 g/cm³ (melt index 6.0 g/10 min) was mixed together by means of a V-blender.

Molding of Film

The same procedure as described in Example 1 was repeated.

TABLE 1

| Pentene-1 | Ethylene copolymer | | | HPPE Amount fed | Physical properties of film | | | | Blance between impact strength and tear strength | Moldability Width of vibration of bubble |
|---|---|---|---|---|---|---|---|---|---|---|
| | Monomer | Density g/cm³ | Amount fed | | Haze % | Glassiness % | Impact strength kg · cm/cm | Tear strength MD/TD (kg/cm) | | |
| Ex. 1 | Pentene-1 | 0.921 | 95 | 5 | 6.5 | 91 | 2500 | 65/140 | Good | Narrow |
| Ex. 2 | Pentene-1 | 0.921 | 90 | 10 | 5.2 | 102 | 2300 | 63/145 | Good | Narrow |
| Ex. 3 | Pentene-1 | 0.921 | 80 | 20 | 4.4 | 105 | 2200 | 61/151 | Good | Narrow |
| Ex. 4 | Pentene-1 | 0.921 | 70 | 30 | 4.8 | 100 | 1900 | 54/146 | Good | Narrow |
| Ex. 5 | Pentene-1 | 0.927 | 90 | 10 | 6.1 | 97 | 1900 | 65/135 | Good | Narrow |
| Ex. 6 | Pentene-1 | 0.935 | 90 | 10 | 6.7 | 93 | 1700 | 45/130 | Good | Narrow |
| Comp. Ex. 1 | Pentene-1 | 0.921 | 100 | 0 | 11.0 | 65 | 3000 | 50/105 | Good | Wide |
| Comp. Ex. 2 | Pentene-1 | 0.927 | 100 | 0 | 12.0 | 67 | 2100 | 69/139 | Good | Wide |
| Comp. Ex. 3 | Pentene-1 | 0.935 | 100 | 0 | 12.2 | 60 | 1700 | 49/133 | Good | Wide |
| Comp. Ex. 4 | Pentene-1 | 0.921 | 50 | 50 | 7.4 | 90 | 1500 | 57/130 | Bad | Narrow |
| Comp. Ex. 5 | — | — | 0 | 100 | 7.0 | 85 | 1100 | 120/100 | Bad | Narrow |
| Comp. Ex. 6 | 4-methyl-pentene-1 | 0.920 | 90 | 10 | 6.6 | 90 | 3100 | 110/171 | Bad | Narrow |
| Comp. Ex. 7 | Butene-1 | 0.923 | 90 | 10 | 6.4 | 90 | 1600 | 40/123 | Bad | Narrow |
| Comp. Ex. 8 | Octene-1 | 0.923 | 90 | 10 | 6.8 | 88 | 3050 | 115/177 | Bad | Narrow |
| Comp. Ex. 9 | Hexene-1 | 0.923 | 90 | 10 | 8.1 | 69 | 2700 | 135/205 | Bad | Narrow |
| Comp. Ex. 10 | Butene-1 | 0.921 | 90 | 10 | 6.2 | 92 | 1600 | 40/124 | Bad | Narrow |
| Comp. Ex. 11 | Hexene-1 | 0.921 | 90 | 10 | 6.3 | 91 | 2800 | 120/195 | Bad | Narrow |
| Comp. Ex. 12 | Butene-1 | 0.921 | 100 | 0 | 8.9 | 69 | 1700 | 44/125 | Bad | Wide |
| Comp. Ex. 13 | Hexene-1 | 0.921 | 100 | 0 | 11.0 | 65 | 2900 | 135/200 | Bad | Wide |

Evaluation of Film

The molded film was evaluated to determine its tensile characteristics, impact strength and tear strength according to the procedure as described in Example 1. Further, antiblocking properties of the film obtained was measured in accordance with ASTM D 1893.

Results obtained are shown in Table 2.

EXAMPLE 8

Example 7 was repeated to prepare a composition, except that the proportion by weight of the ethylene/pentene-1 copolymer to the polyethylene was changed to 95:5, and a film was formed by using the composition thus prepared.

Characteristics of the film are shown in Table 2.

EXAMPLE 9

Example 7 was repeated to prepare a composition, except that the proportion by weight of the ethylene/pentene-1 copolymer to the polyethylene was changed to 90:10, and a film was formed by using the composition thus prepared.

Characteristics of the film are shown in Table 2.

EXAMPLE 10

Example 7 was repeated to obtain a composition, except that an ethylene/pentene-1 copolymer obtained by varying the feeding rate of ethylene, n-pentene-1 and hydrogen, said ethylene/pentene-1 copolymer having a melt flow rate (190° C.) of 1.6 g/10 min, a density of 0.927 g/cm$^3$, a repeating unit derived from pentene-1 of 9.2% by weight in terms of monomer, RS of 41.7 (impact strength=2000 kg.cm/cm, tear strength in the take-off direction=48 kg/cm) and the Hh/Hl ratio of 0.67, and a film was formed by using the composition thus prepared.

Characteristics of the film are shown in Table 2.

EXAMPLE 11

Example 7 was repeated except that there was used an ethylene/pentene-1 copolymer obtained by varying the feeding rate of ethylene, n-pentene-1 and hydrogen, said ethylene/pentene-1 copolymer having a melt flow rate (190° C.) of 2.2 g/10 min. a density of 0.935 g/cm$^3$, a repeating unit derived from pentene-1 of 4.1% by weight in terms of monomers, RS of 34 (impact strength=1700 kg.cm/cm, tear strength in the take-off direction=50 kg/cm), and the Hh/Hl ratio of 0.73.

Results obtained are shown in Table 2.

COMPARATIVE EXAMPLE 14

Example 7 was repeated to prepare a film, except that only the ethylene/pentene-1 copolymer was used without using the polyethylene.

Characteristics of the film thus prepared are shown in Table 2.

COMPARATIVE EXAMPLE 15

Example 10 was repeated to prepare a film, except that only the ethylene/pentene-1 copolymer prepared in Example 10 was used without using the polyethylene.

Characteristics of the film thus prepared are shown in Table 2.

COMPARATIVE EXAMPLE 16

Example 11 was repeated to prepare a film, except that only the ethylene/pentene-1 copolymer prepared in Example 11 was used without using the polyethylene.

Characteristics of the film thus prepared are shown in Table 2.

COMPARATIVE EXAMPLE 17

Example 7 was repeated to prepare a film, except that the proportion by weight of the ethylene/pentene-1 copolymer to the polyethylene was changed to 55:45, and a film was formed by using the composition thus prepared.

Characteristics of the film thus prepared are shown in Table 2.

COMPARATIVE EXAMPLE 18

Example 8 was repeated except that in place of the ethylene/pentene-1 copolymer of Example 7, an ethylene/butene-1 copolymer polymerized under such conditions as mentioned below was used.

Results are shown in Table 2.

Preparation of Titanium Catalyst Component

The same procedure as described in Example 1 was repeated except that the amount of Ti(OC$_2$H$_5$)$_4$ used was changed to 0.54 mole.

Polymerization

The same procedure as described in Example 1 was repeated except that the titanium catalyst component obtained above was fed at a rate of 0.5 mmol/h, in terms of Ti atom, the ethylaluminum sesquichloride was fed at a rate of 21.5 mmol/h, butene-1 was fed at a rate of 3.4 kg/h and hydrogen was fed at a rate of 7.3 l/h.

The copolymer thus obtained had a melt flow rate (190° C.) of 2.0 g/10 min, a density of 0.921 g/cm$^3$, RS of 20.5 (impact strength=900 kg.cm/cm, tear strength=44 kg/cm) and the Hh/Hl ration of 0.35.

COMPARATIVE EXAMPLE 19

Example 8 was repeated except that in place of the ethylene/pentene-1 copolymer of Example 7, there was used an ethylene/hexene-1 copolymer polymerized under such conditions as mentioned below.

Results obtained are shown in Table 2.

Preparation of Titanium Catalyst Component

The same procedure as described in Example 1 was repeated except that the amount of Ti(OC$_2$H$_5$)$_4$ added was changed to 0.43 mole.

Polymerization

The same procedure as described in Example 1 was repeated except that the ethylaluminum sesquichloride was fed at a rate of 17.2 mmol/h, the titanium catalyst component obtained above was fed at a rate of 0.5 mmol/h, hexene-1 was fed at a rate of 6.7 kg/h and hydrogen was fed at a rate of 11.3 l/h.

The copolymer thus obtained had a melt flow rate (190° C.) of 2.0 g/10 min, a density of 0.920 g/cm$^3$, RS of 33 (impact strength=3300 kg.cm/cm, tear strength=110 kg/cm) and the Hh/Hl ration of 0.82.

TABLE 2

| | Ethylene copolymer (A) | Polyethylene (C) |
|---|---|---|
| | Amount | Amount |

TABLE 2-continued

|  | Monomer | Density (g/cm³) | Crystallinity index (%) | fed (wt %) | Density (g/cm³) | Crystallinity index (%) | fed (wt %) |
|---|---|---|---|---|---|---|---|
| Ex. 7 | Pentene-1 | 0.921 | 38 | 97 | 0.955 | 62 | 3 |
| 8 | Pentene-1 | 0.921 | 38 | 95 | 0.955 | 62 | 5 |
| 9 | Pentene-1 | 0.921 | 38 | 90 | 0.955 | 62 | 10 |
| 10 | Pentene-1 | 0.927 | 45 | 95 | 0.955 | 62 | 5 |
| 11 | Pentene-1 | 0.935 | 50 | 95 | 0.955 | 62 | 5 |
| Comp. Ex. 14 | Pentene-1 | 0.921 | 38 | 100 | — | — | 0 |
| 15 | Pentene-1 | 0.927 | 45 | 100 | — | — | 0 |
| 16 | Pentene-1 | 0.935 | 50 | 100 | — | — | 0 |
| 17 | Pentene-1 | 0.921 | 38 | 55 | 0.955 | 62 | 45 |
| 18 | butene-1 | 0.921 | 38 | 95 | 0.955 | 62 | 5 |
| 19 | Hexene-1 | 0.920 | 36 | 95 | 0.955 | 62 | 5 |

|  | Characteristics | | | |
|---|---|---|---|---|
|  | Anti-blocking Properties (g/10 mm) | Impact strength (kg·cm/cm) | Tear strength MD/TD (g/15 mm) | Tensile characteristics Stress at yield MD/TD (kg/cm) |
| Ex. 7 | 3.2 | 2700 | 42/115 | 128/110 |
| 8 | 2.3 | 2500 | 38/115 | 133/110 |
| 9 | 1.0 | 2200 | 33/120 | 135/115 |
| 10 | 1.5 | 1800 | 51/140 | 146/150 |
| 11 | 0 | 1400 | 38/140 | 160/180 |
| Comp. Ex. 14 | 8.3 | 3000 | 50/105 | 122/108 |
| 15 | 5.0 | 2100 | 69/139 | 138/145 |
| 16 | 1.8 | 1700 | 49/133 | 150/170 |
| 17 | 0 | 900 | 25/150 | 160/120 |
| 18 | 2.0 | 900 | 34/113 | 135/113 |
| 19 | 2.7 | 3000 | 160/220 | 130/110 |

EXAMPLE 12

Preparation of Ethylene/Pentene-1 Copolymer

Preparation of Titanium Catalyst Component

The same procedure as described in Example 1 was repeated.

Polymerization

The same procedure as described in Example 1 was repeated except that the pentene-1 was fed at a rate of 2.2 kg/h.

The copolymer thus obtained had a melt flow rate (190° C.) of 2.2 g/10 min, a density of 0.935 g/cm³, a structural unit derived from pentene-1 of 4.1% by weight, RS of 34 (impact strength=1700 kg.cm/cm, tear strength in the take-off direction=50 kg/cm) and the Hh/Hl ratio of 3.4.

Preparation of Composition

The same procedure as described in Example 1 was repeated except that a mixture of 90 parts by weight of pellets of the copolymer and 10 parts by weight of pellets of an ethylene/butene-1 copolymer rubber (melt index 4.0, butene-1 content 12 mol %, Mw/Mn=2.5, tensile modulus 300.kg.f/cm², crystallinity index 23%) was blended in V-blender.

Molding of Film

The same procedure as described in Example 1 was repeated.

Evaluation of Film

The molded film was evaluated to determine its tensile characteristics, impact strength, tear strength and transparency in accordance with the procedure as described in Example 1. Heat sealability of the film was determined in accordance with JIS X 1707.

Results obtained are shown in Table 3.

EXAMPLE 13

Example 12 was repeated except that the proportion by weight of the ethylene/pentene-1 copolymer to the ethylene/butene-1 copolymer rubber was changed to 80:20 to prepare a composition, and a film was formed by using the composition thus prepared.

Characteristics of the film thus formed are shown in Table 3.

EXAMPLE 14

Example 12 was repeated except that the proportion by weight of the ethylene/pentene-1 copolymer to the ethylene/butene-1 copolymer rubber was changed to 70:30 to prepare a composition, and a film was formed by using the composition thus prepared.

Characteristics of the film thus formed are shown in Table 3.

EXAMPLE 15

Example 13 was repeated to obtain a composition, except that an ethylene/pentene-1 copolymer obtained by varying the feeding rate of ethylene, n-pentene-1 and hydrogen in Example 12, said copolymer having a melt flow rate (190° C.) of 1.6 g/10 min, a density of 0.927 g/cm³, a structural unit derived from pentene-1 of 9.2% by weight in terms of monomer, RS of 41.7 (impact strength=2000 kg.cm/cm, tear strength in the take-off direction=48 kg/cm) and the Hh/Hl ratio of 2.3, and a film was formed by using the composition thus prepared.

Characteristics of the film thus formed are shown in Table 3.

EXAMPLE 16

Example 13 was repeated except that there was used an ethylene/pentene-1 copolymer obtained by varying the feeding rate of ethylene, n-pentene-1 and hydrogen, said ethylene/pentene-1 copolymer having a melt index (190° C.) in Example 12 of 2.2 g/10 min. a density of 0.921 g/cm³, a structural unit derived from pentene-1 of 12% by weight, RS of 50 (impact strength=3000 kg.cm/cm, tear strength in the take-off direction=60 kg/cm), and the Hh/Hl ratio of 1.5.

Results obtained are shown in Table 3.

COMPARATIVE EXAMPLE 20

Example 12 was repeated to prepare a film, except that only the ethylene/pentene-1 copolymer was used without using the ethylene/butene-1 copolymer rubber.

Characteristics of the film thus formed are shown in Table 3.

COMPARATIVE EXAMPLE 21

Example 15 was repeated to prepare a film, except that on the ethylene/pentene-1 copolymer prepared in Example 15 was used without using the ethylene/butene-1 copolymer rubber.

Characteristics of the film thus formed are shown in Table 3.

COMPARATIVE EXAMPLE 22

Example 16 was repeated to prepare a film, except that only the ethylene/pentene-1 copolymer prepared in Example 16 was used without using the ethylene/butene-1 copolymer rubber.

Characteristics of the film thus formed are shown in Table 3.

COMPARATIVE EXAMPLE 23

Example 12 was repeated to prepare a composition, except that the proportion by weight of the ethylene/pentene-1 copolymer to the ethylene/butene-1 copolymer rubber was changed to 55:45, and a film was formed by using the composition thus prepared.

Characteristics of the film thus formed are shown in Table 3.

COMPARATIVE EXAMPLE 24

Example 13 was repeated except that there was used Moatek 0234M, a product of Idemitsu Petrochemical Ind. Ltd. in place of the ethylene/pentene-1 copolymer of Example 12.

Results obtained are shown in Table 3.

COMPARATIVE EXAMPLE 25

Example 13 was repeated except that there was used LLDPE FG326, a product of Nihon Unika K.K. in place of the ethylene/pentene-1 copolymer of Example 12.

Results obtained are shown in Table 3.

COMPARATIVE EXAMPLE 26

Example 13 was repeated except that there was used Ultzex 2020L, a product of Mitsui Petrochemical Ind. Ltd., in place of the ethylene/pentene-1 copolymer of Example 12.

Results obtained are shown in Table 3.

TABLE 3

|  | | Ethylene copolymer | | | Soft resin | |
| --- | --- | --- | --- | --- | --- | --- |
|  | Comonomer | Density (g/cm$^3$) | Crystallinity index (%) | Amount fed (wt %) | Crystallinity index (%) | Amount fed (wt %) |
| Ex. 12 | Pentene-1 | 0.935 | 50 | 90 | 23 | 10 |
| 13 | Pentene-1 | 0.935 | 50 | 80 | 23 | 20 |
| 14 | Pentene-1 | 0.935 | 50 | 70 | 23 | 30 |
| 15 | Pentene-1 | 0.927 | 45 | 80 | 23 | 20 |
| 16 | Pentene-1 | 0.921 | 38 | 80 | 23 | 20 |
| Comp. Ex. 20 | Pentene-1 | 0.935 | 50 | 100 | — | 0 |
| 21 | Pentene-1 | 0.927 | 45 | 100 | — | 0 |
| 22 | Pentene-1 | 0.921 | 38 | 100 | — | 0 |
| 23 | Pentene-1 | 0.935 | 50 | 55 | 23 | 45 |
| 24 | butene-1 | 0.923 | 40 | 80 | 23 | 20 |
| 25 | Hexene-1 | 0.923 | 39 | 80 | 23 | 20 |
| 26 | 4-methyl-pentene-1 | 0.922 | 39 | 80 | 23 | 20 |

|  | | | Characteristics | | | |
| --- | --- | --- | --- | --- | --- | --- |
|  | Haze (%) | Glassiness (%) | Heat seal strength (g/15 mm) | Impact strength (kg · cm/cm) | Tear strength MD/TD (g/15 mm) | Tensile characteristics Stress at yield MD/TD (kg/cm) |
| Ex. 12 | 8.6 | 90 | 150 at 120° C. | 2500 | 55/135 | 145/148 |
| 13 | 6.3 | 100 | 680 at 120° C. | 3500 | 55/133 | 120/125 |
| 14 | 5.9 | 105 | 980 at 120° C. | 4000 | 60/125 | 114/117 |
| 15 | 7.1 | 105 | 600 at 110° C. | 4000 | 67/140 | 113/108 |
| 16 | 7.6 | 95 | 730 at 105° C. | 4600 | 53/110 | 100/85 |
| Comp. Ex. 20 | 12.2 | 60 | 70 at 120° C. | 1700 | 49/133 | 150/170 |
| 21 | 12.0 | 65 | 60 at 110° C. | 2100 | 69/139 | 138/145 |
| 22 | 11.0 | 65 | 60 at 105° C. | 3000 | 50/105 | 122/108 |
| 23 | 12.5 | 60 | 820 at 120° C. | 3800 | 58/128 | 98/96 |
| 24 | 6.0 | 108 | 830 at 105° C. | 2300 | 50/108 | 96/82 |
| 25 | 7.5 | 90 | 580 at 105° C. | 4400 | 140/206 | 102/88 |
| 26 | 7.0 | 97 | 510 at 105° C. | 4700 | 136/201 | 105/90 |

What is claimed is:

1. An ethylene/pentene-1 copolymer composition comprising
    (A) an ethylene/pentene-1 copolymer obtained by copolymerization of ethylene and pentene-1, said ethylene/pentene-1 copolymer satisfying the following requisites (a) to (d):
    (a) a melt flow rate of said copolymer as measured according to ASTM D 1238E is in the range of 0.01 to 100 g/10 min;
    (b) a density of said copolymer as measured according to ASTM D 1505 is in the range of 0.88 to 0.94 g/cm$^3$;

(c) said copolymer contains structural units derived from pentene-1 in an amount of 1 to 25% by weight; and (d) in the case that said copolymer is subjected to cast molding to prepare a film having a thickness of 40 μm, a ratio (RS) of impact strength of the film to tearing strength of the film in the take-off direction of the film satisfies the following formula $$RS \geq -20 \log MFR - 1000d + 968$$

wherein MFR represents a melt flow rate of said copolymer, and d represents a density of said copolymer; and (B) a high-pressure polyethylene having a density of 0.915 to 0.935 g/cm³ in the ratio (A/B) of 99:1 to 60:40 by weight.

2. An ethylene/pentene-1 copolymer composition comprising (A) an ethylene/pentene-1 copolymer obtained by copolymerization of ethylene and pentene-1, said ethylene/pentene-1 copolymer satisfying the following requisites (a) to (d):

(a) a melt flow rate of said copolymer as measured according to ASTM D 1238E is in the range of 0.01 to 100 g/10 min;

(b) a density of said copolymer as measured according to ASTM D 1505 is in the range of 0.88 to 0.94 g/cm³;

(c) said copolymer contains structural units derived from pentene-1 in an amount of 1 to 25% by weight; and (d) in the case that said copolymer is subjected to cast molding to prepare a film having a thickness of 40 μm, a ratio (RS) of impact strength of the film to tearing strength of the film in the take-off direction of the film satisfies the following formula $$RS \geq -20 \log MFR - 1000d + 968$$

wherein MFR represents a melt flow rate of said copolymer, and d represents a density of said copolymer; and (C) a polyethylene having a density of 0.945 to 0.975 g/cm³, in the ratio (A/C) of 99:1 to 60:40 by weight.

3. An ethylene/pentene-1 copolymer composition comprising (A) an ethylene/pentene-1 copolymer obtained by copolymerization of ethylene and pentene-1, said ethylene/pentene-1 copolymer satisfying the following requisites (a) to (d):

(a) a melt flow rate of said copolymer as measured according to ASTM D 1238E is in the range of 0.01 to 100 g/10 min;

(b) a density of said copolymer as measured according to ASTM D 1505 is in the range of 0.88 to 0.94 g/cm³;

(c) said copolymer contains structural units derived from pentene-1 in an amount of 1 to 25% by weight; and (d) in the case that said copolymer is subjected to cast molding to prepare a film having a thickness of 40 μm, a ratio (RS) of impact strength of the film to tearing strength of the film in the take-off direction of the film satisfies the following formula $$RS \geq -20 \log MFR - 1000d + 968$$

wherein MFR represents a melt flow rate of said copolymer, and d represents a density of said copolymer; and (D) a low crystalline or amorphous α-olefin random copolymer other than ethylene/pentene-1 copolymer, containing at least two types of constitution units derived from different α-olefins, in the ratio (A/D) of 99:1 to 60:40 by weight.

4. The ethylene/pentene-1 copolymer composition as claimed in claim 1, 2 or 3, wherein the ethylene/pentene-1 copolymer (A) is obtained by copolymerizing ethylene and pentene-1 in the presence of an olefin polymerization catalyst comprising

[A] a solid titanium catalyst component containing magnesium, titanium, halogen and an electron donor as its essential ingredients and obtained by bringing (i) a liquid magnesium compound having no reducing ability and (ii) a liquid titanium compound into contact, as they are, with each other in the presence of (iii) an electron donor having no active hydrogen, or by bringing said (i) and said (ii) into contact, as they are, with each other, followed by contact with said (iii), and

[B] an organic compound catalyst component of a metal belonging to the Group I to III of the periodic table.

5. The ethylene/pentene-1 copolymer copolymer composition as claimed in claim 1, 2 or 3, wherein the ethylene/pentene copolymer (A) is obtained by copolymerization of ethylene and pentene-1 in the presence of an olefin polymerization catalyst comprising a solid titanium catalyst component [A] for olefin polymerization obtained by reaction of a hydrocarbon-insoluble solid magnesium.aluminum composite selected from ($A_1$) or ($A_2$) mentioned below and a tetravalent titanium compound, containing at least titanium atoms in a low valent state in the proportion of not less than 10%, and having OR group in an amount of from 1 to 15 in terms of OR/Mg (weight ratio), and an organoaluminum compound catalyst component [B], said ($A_1$) representing a solid magnesium.aluminum composite having $R^1O$ group and $R^2$ group ($R^1$ and $R^2$ is each a hydrocarbon residue) and obtained from (i) a liquid magnesium compound formed from a mixture containing a magnesium compound and an electron donor or (ii) a liquid magnesium compound formed from a solution of a magnesium compound in a hydrocarbon solvent, and said ($A_2$) representing a solid magnesium.aluminum composite containing $R^1O$ group and $R^3$ group ($R^3$ is a hydrocarbon residue) and obtained by reaction of (a) a solid magnesium compound (B) containing $R^1O$ group or $R^1OH$ and obtained from (i) a liquid magnesium compound formed from a mixture containing a magnesium compound and an electron donor or (ii) a liquid magnesium compound formed from a solution of a magnesium compound in a hydrocarbon solvent or (b) the above-mentioned ($A_1$) with an organometallic compound (C) of a metal belonging to the Group I to III of the periodic table.

6. The ethylene/pentene-1 copolymer composition as claimed in claim 1, 2 or 3, wherein the ethylene/pentene-1 copolymer (A) is a copolymer obtained by copolymerization of ethylene and pentene-1 in the presence of an olefin polymerization catalyst comprising

[A] a liquid titanium catalyst component comprising a halogen-containing magnesium compound, oleyl alcohol and a titanium compound, and

[B] a halogen-containing organoaluminum compound.

7. A film composed of the composition as claimed in claim 1, 2 or 3.

8. The film as claimed in claim 7, wherein the film has a thickness of 10 $\mu$m to 3 mm.

9. A packaging material comprising the film as claimed in claim 7.

* * * * *